US012699944B1

(12) United States Patent
Passov et al.

(10) Patent No.: US 12,699,944 B1
(45) Date of Patent: Aug. 4, 2026

(54) METHOD AND SYSTEM FOR PROCESS MAPPING, INCLUDING TASK MINING, PROCESS RECOGNITION, AND CASE RECOGNITION

(71) Applicant: Stereologic Ltd., Toronto (CA)

(72) Inventors: Stanislav Passov, Toronto (CA);
Alexander Ladizginsky, Toronto (CA);
Sofia Passova, Toronto (CA)

( * ) Notice: Subject to any disclaimer, the term of this patent is extended or adjusted under 35 U.S.C. 154(b) by 57 days.

(21) Appl. No.: 18/353,652

(22) Filed: Jul. 17, 2023

Related U.S. Application Data

(60) Provisional application No. 63/389,434, filed on Jul. 15, 2022.

(51) Int. Cl.
*G06Q 10/0633* (2023.01)
*G06Q 10/0639* (2023.01)

(52) U.S. Cl.
CPC ... *G06Q 10/06398* (2013.01); *G06Q 10/0633* (2013.01)

(58) Field of Classification Search
CPC .................................................. G06Q 10/0633
See application file for complete search history.

(56) References Cited

U.S. PATENT DOCUMENTS

| | | | | |
|---|---|---|---|---|
| 12,164,936 B1 * | 12/2024 | Chandrasekaran | ... | G06F 16/211 |
| 2006/0184410 A1 * | 8/2006 | Ramamurthy | ......... | G06Q 10/10 |
| | | | | 706/8 |
| 2007/0226022 A1 * | 9/2007 | Das | ........................... | G06F 8/10 |
| | | | | 705/7.36 |
| 2008/0177586 A1 * | 7/2008 | Jamjoom | ............... | G06Q 10/06 |
| | | | | 706/52 |
| 2010/0174583 A1 * | 7/2010 | Passova | ............. | G06Q 10/0633 |
| | | | | 705/348 |
| 2022/0019955 A1 * | 1/2022 | Davis | ............... | G06Q 10/06393 |
| 2022/0138076 A1 * | 5/2022 | Van Den Heuvel | ... | G06V 40/20 |
| | | | | 709/224 |
| 2023/0066141 A1 * | 3/2023 | Mohanty | .................. | G06F 8/77 |

OTHER PUBLICATIONS

Keller, P. J., & Jacka, J. M. (1999). Process mapping. The Internal Auditor, 56(5), 60-64. Retrieved from https://dialog.proquest.com/professional/docview/202739357?accountid=131444 (Year: 1999).*
Z. Gao, J. Liu, C. Jiao and H. Zhang, "Definition of Process Realization Pattern and Automatic Generation Method of Recognition Rules," 2021 IEEE 12th International Conference on Software Engineering and Service Science (ICSESS), Beijing, China, 2021, pp. 118-121 (Year: 2021).*

* cited by examiner

*Primary Examiner* — Johnna R Loftis
(74) *Attorney, Agent, or Firm* — Amarok IP Inc.; Neil W. Henderson

(57) ABSTRACT

A method and system for process mapping including: a processor; and a memory storage operatively connected with the processor, wherein the memory stores computer-readable instructions, which, when executed by the processor, performs the method of: recording activities performed by employees on a plurality of computers, wherein the activities comprise screens used and related data that can be obtained through a web-based connection; analyzing the screens used and related data to generate employee activity data; determining processes based on the activity data; and generating a process map based on the determined processes.

8 Claims, 24 Drawing Sheets

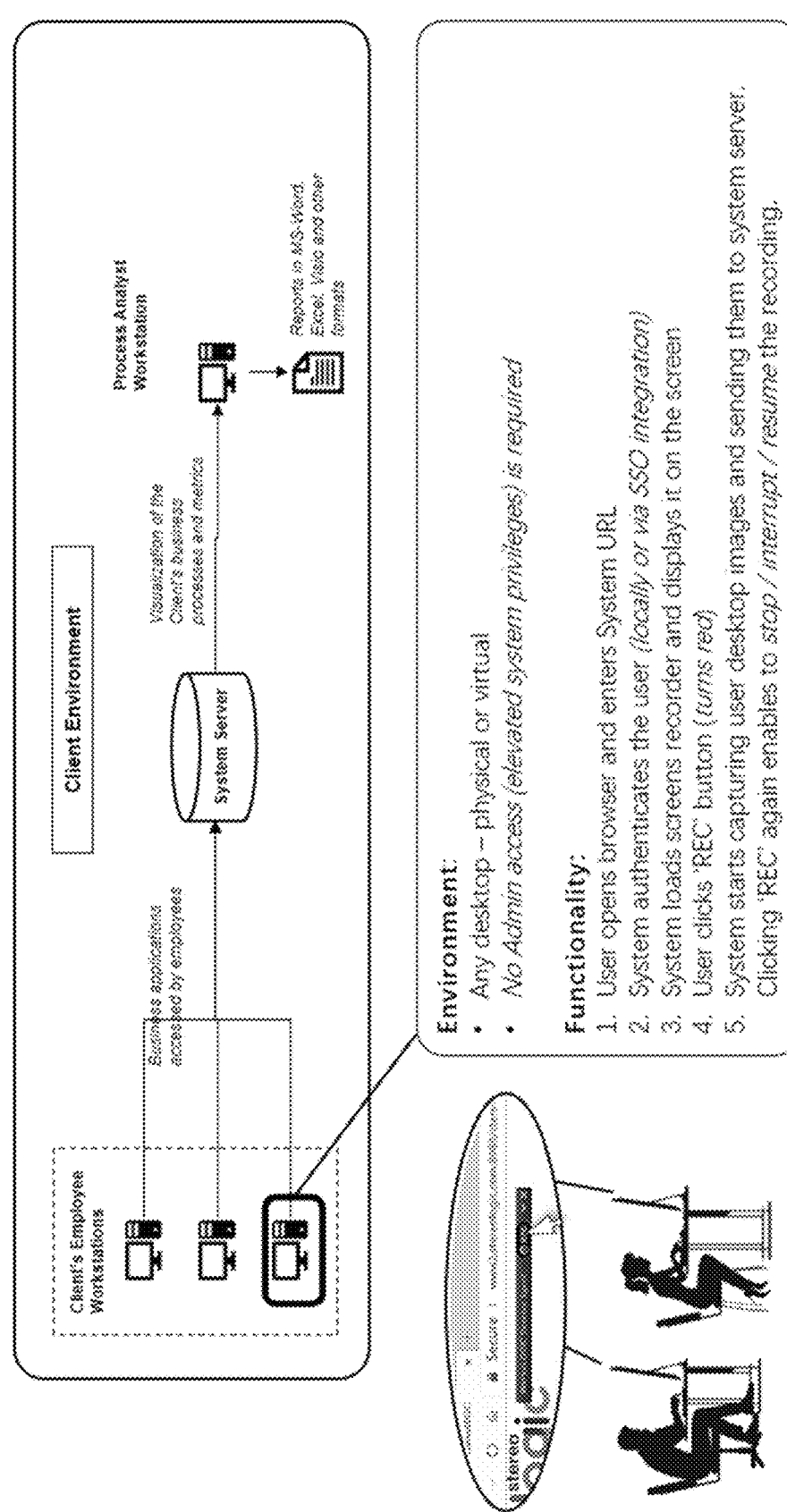

SCREEN RECORDING
Recording without installation on User's Machine

Client Environment

Business applications accessed by employees

Client's Employee Workstations

System Server

Visualization of the Client's business processes and metrics

Process Analyst Workstation

Reports in MS-Word, Excel, Visio and other formats

Environment:
- Any desktop – physical or virtual
- *No Admin access (elevated system privileges) is required*

Functionality:
1. User opens browser and enters System URL
2. System authenticates the user *(locally or via SSO integration)*
3. System loads screens recorder and displays it on the screen
4. User clicks 'REC' button (*turns red*)
5. System starts capturing user desktop images and sending them to system server.
   Clicking 'REC' again enables to *stop / interrupt / resume* the recording.

FIG. 11

SCREEN RECORDING

Examples of External Attributes and User System Events

| External Operating System Attributes (Example: MS-Windows) |
| --- |

These are selected examples data of String or Integers types sometimes combined into complex variables:

a) Element Title b) Title c) URL d) Hash e) AppType f) WindowClass g) Element Type h) username (Read-only)

i) App specific attributes (Ex. MS-Excel, selected cell)

| User / System Events (Example: MS-Windows) |
| --- | a) Events List(s)

b) User Event – a complex variable with the following members:

1. Event String – Required

2. Event coordinates X (If available)

3. Event coordinates Y (If available)

4. Event Type (Low Level / MSAA / App Specific)

5. Triggering or Not – If event triggers the Screenshot, then the type is set to 1, otherwise 0

6. Event time (Read only)

7. Many more app-specific attributes ..

FIG. 13

METHOD AND SYSTEM FOR PROCESS MAPPING, INCLUDING TASK MINING,PROCESS RECOGNITION, AND CASE RECOGNITION

FIELD

The present disclosure relates generally to process mapping in computer systems. More particularly, the present disclosure relates to a method and system for process mapping in a computer system using task mining, process recognition, and case recognition.

BACKGROUND

Process mapping and discovery has been a developing area in computer science. Process mapping and discovery involves the analysis of a worker's process while completing tasks by observing the operations performed by the work and is intended to provide insight into computer-enabled processes used in various environments.

Conventional process mapping and discovery generally relies on having a software package installed on each employee computer or device that has administrative access to all activity of the employee computer or device. However, there are privacy concerns and the like in having this level of access on all computers and devices. Further, conventional process mapping is typically a very manual process, relying on human users, which is very expensive and time-consuming.

As such, there is a need for an improved system and method of process mapping that overcomes at least some of the concerns involved in conventional systems and methods.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for process mapping including: recording activities performed by employees on a plurality of computers, wherein the activities comprise screens used and related data that can be obtained through a web-based connection; analyzing the screens used and related data to generate employee activity data; determining processes based on the activity data; and generating a process map based on the determined processes.

In some cases, the analyzing the screens used and related data to generate employee activity data may include: identifying application in use, screen elements, and screen attributes; and using artificial intelligence to analyze the screen elements and screen attributes based on the application in use.

In some cases, the determining processes based on the activity data may include: determining generic processes based on predefined recognition patterns; determining specific processes based on generated recognition patterns; and determining process cases and instances based on case classifiers.

In some cases, the predefined recognition patterns may include: generic predefined recognition patterns and customer-specific recognition patterns.

In another aspect, there is provided a system for process mapping including: a processor; and a memory storage operatively connected with the processor, wherein the memory stores computer-readable instructions, which, when executed by the processor, performs the functions of the following modules: an input for recording activities performed by employees on a plurality of computers, wherein the activities comprise screens used and related data that can be obtained through a web-based connection; a screens module configured to analyze the screens used and related data to generate employee activity data; a processes module configured to determine processes based on the activity data; and a process map module configured to generate a process map based on the determined processes.

In some cases, the process module may determine processes based on the activity data by: determining generic processes based on predefined recognition patterns; determining specific processes based on generated recognition patterns; and determining process cases and instances based on case classifiers.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 11 illustrates an embodiment of screen recording;

FIG. 13 illustrates example external attributes and user system events when screen recording as in FIGS. 11 and 12;

DETAILED DESCRIPTION

The following description with reference to the accompanying drawings is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not intended to be limited to the bibliographical meanings, but, are merely used to enable a clear and consistent understanding. Accordingly, it should be apparent to those skilled in the art that the following description of embodiments is provided for illustration purpose only and not for the purpose of limiting the invention as defined by the appended claims and their equivalents.

Generally, the present disclosure provides a method and system for process mapping that operates without the need for password level access to computers and devices. The system and method make use of multiple inputs to clarify each step in a process and hierarchical review of key elements to combine process steps into a process map.

Figure 1:
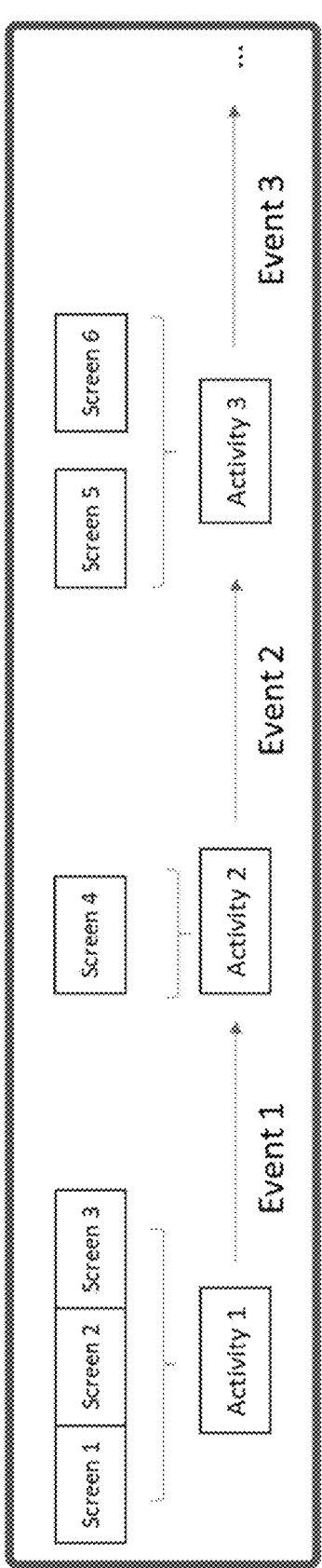
FIG. 1 illustrates activities in a business environment.

In the following description, it will be useful to define some terms and concepts. Generally speaking, the system and method herein involve is gathering of images of employee user's screens as well as associated metadata ('recorded data") without the need for a software package on the employee computer. The system uses a type of web-app installed from a web site to make a conduit for data. The system collects a sequence of screens and events/actions that allows analysis to determine what an employee is working on. In some cases, screen sequences may have no differences or only minor differences and therefore can be combined. Such a combination of screens is called an Activity (see FIG. 1), which serves as basis for a recognition tool. Recorded data are generally visualized in the form of activities containing single or multiple screens. An activity also contains a set of attributes, which can be derived from screens (via optical character recognition (OCR) or the like) and, in some cases, metadata that may be available for the screens. Some advanced attributes might be hidden or not initially known (such as attributes based on screen recognition) and therefore can be obtained during later stages by applying recognition rules.

Figure 2:
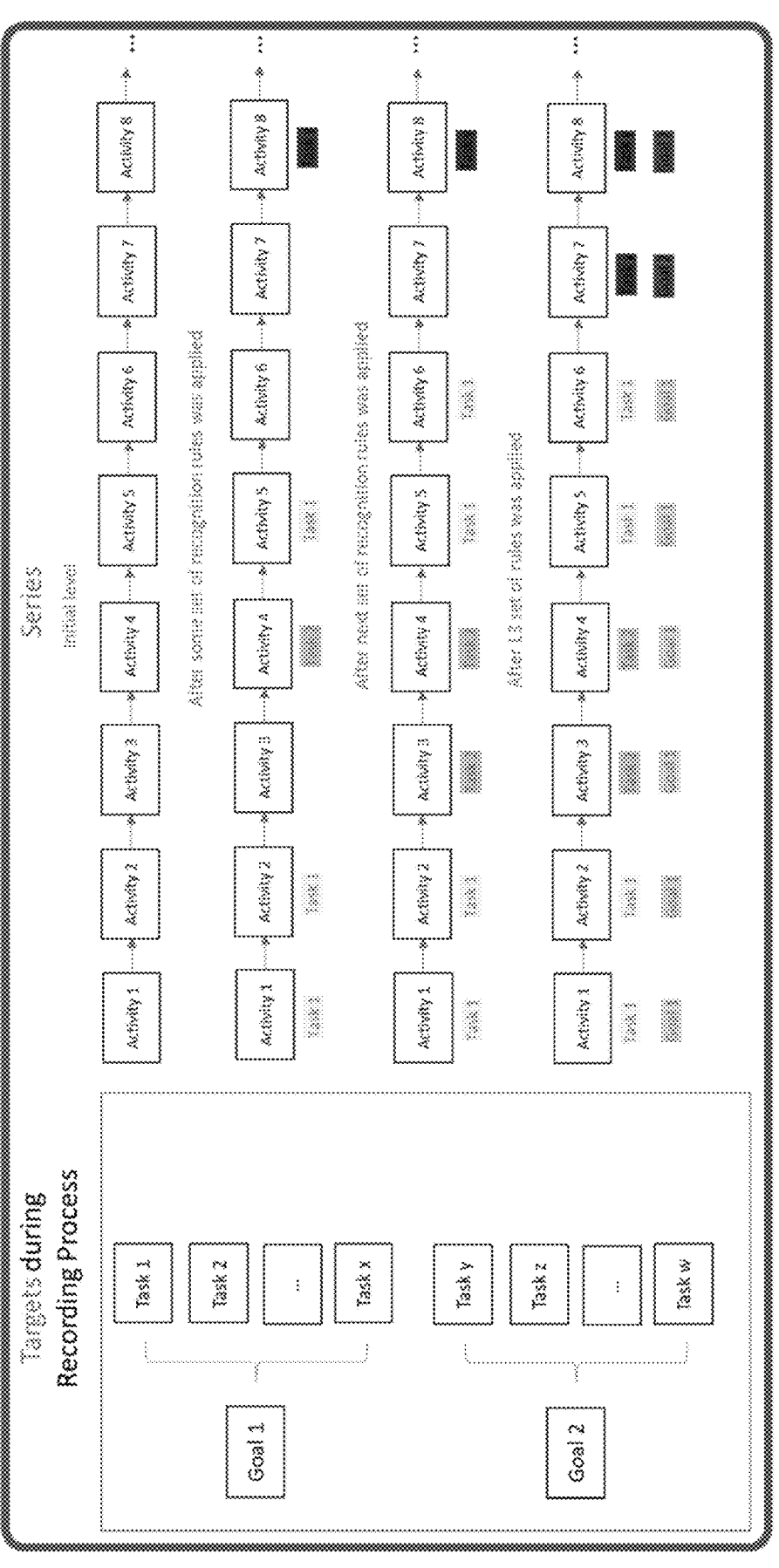
FIG. 2 illustrates tasks and goals and the relation to activities in a business environment.
Figure 3:
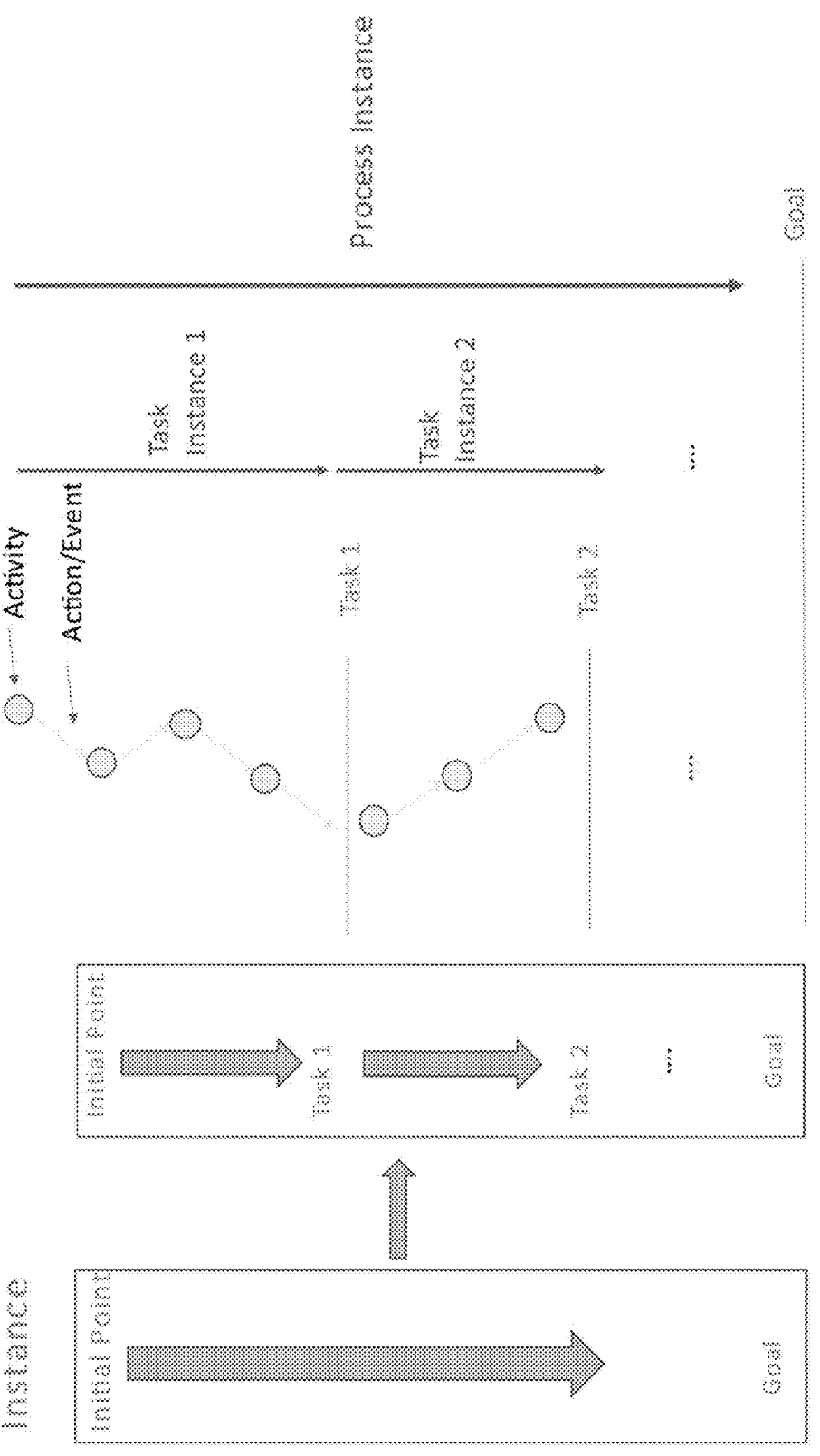
FIG. 3 illustrates task and process instances in a business environment.

Typically, employee users perform their work based on certain goals which they are planning to achieve. Each Goal is typically a logically closed and objective. To complete a goal, an employee prepares Tasks which must be executed (see FIG. 2, which illustrates how various Activities may contribute to one or more Tasks). Employees may be able to achieve their goal in various ways. Once the way is chosen, the employee performs the work such that it can be seen as a sequence of activities during the recording sessions. The sequence of activities used by an employee to complete a task is called a Task Instance, while completing a goal is called a Process Instance or just an Instance (see FIG. 3). The goal can be initially chosen, and the plan of actions can be created, however the result may be different from the goal and is dependent on internal data. A result which is meaningful from a business point of view after the instance was completed is called an Outcome. An Instance's Outcome can depend on the data utilized by an employee in the process, except in some unusual cases when the goal wasn't achieved due to external reasons or the like.

Figure 4:
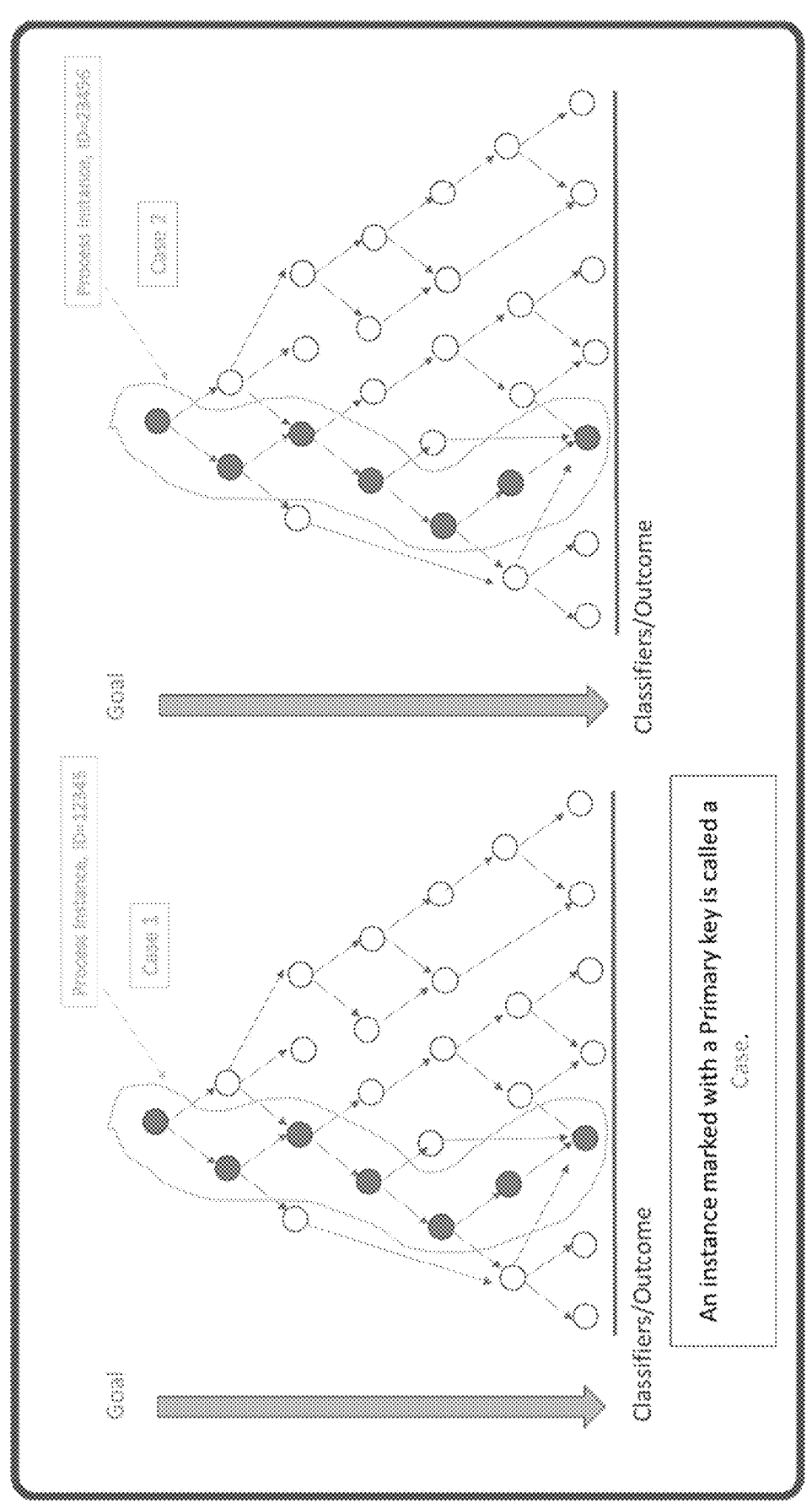
FIG. 4 illustrates cases in relation to instances in a business environment.

An instance marked with a Primary key (i.e. a unique indicator that differentiates from other instances) is called a Case (see FIG. 4). In some cases, there may be some other labels identified with an Instance that assist with providing a relevant description to the case. Such labels are called Classifiers and can be useful during analysis of the results and for reports.

Figure 5:
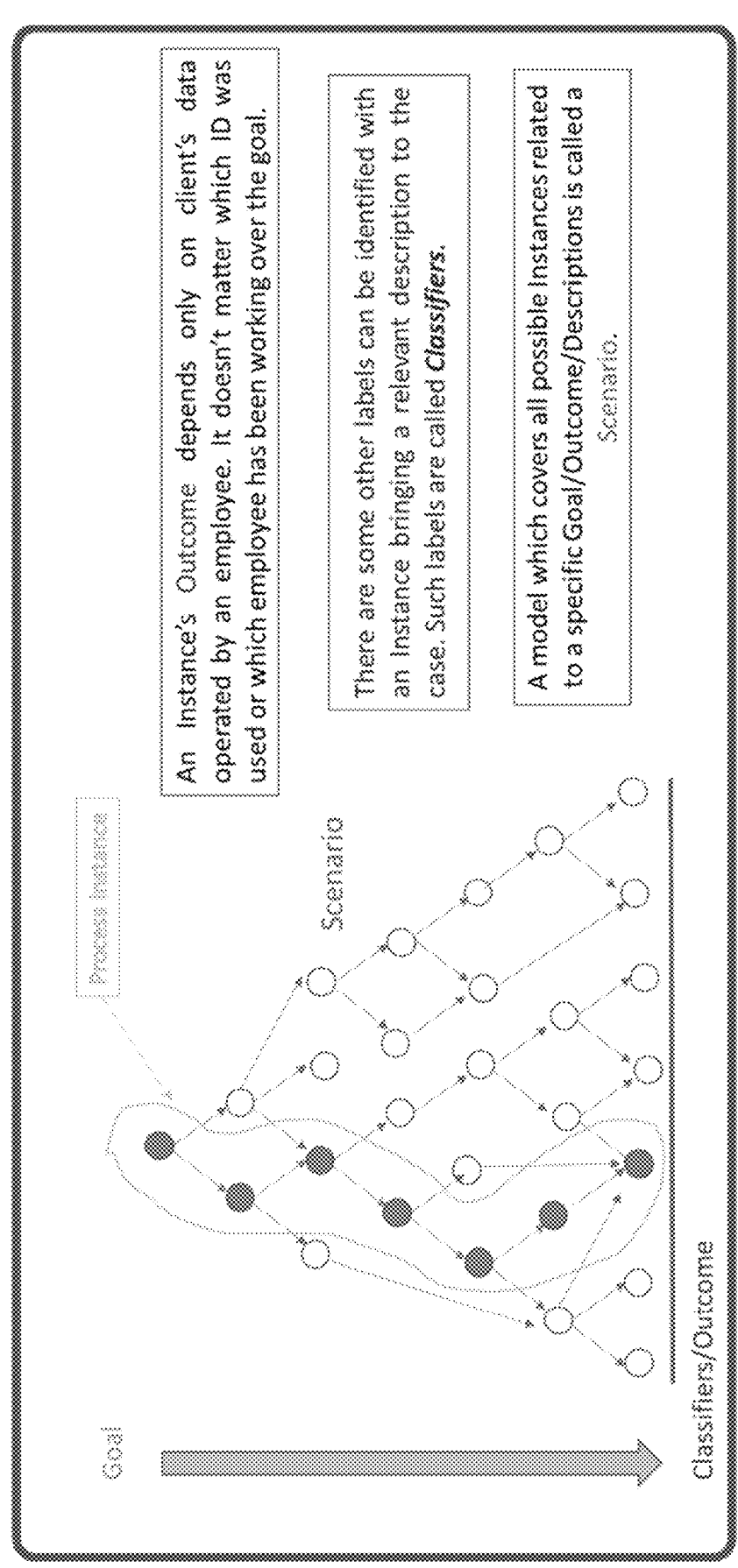
FIG. 5 illustrates scenarios in a business environment.

In embodiments of the system and method herein a model is created based on recorded data. The model intends to understand as many cases as possible and to provide a way to recognize cases in the future. A part of the model which describes Instances related to a specific combination of Goal, Outcome, and Classifiers is called a Scenario (see FIG. 5). A Scenario can include not observed but modelled instances.

Figure 6:
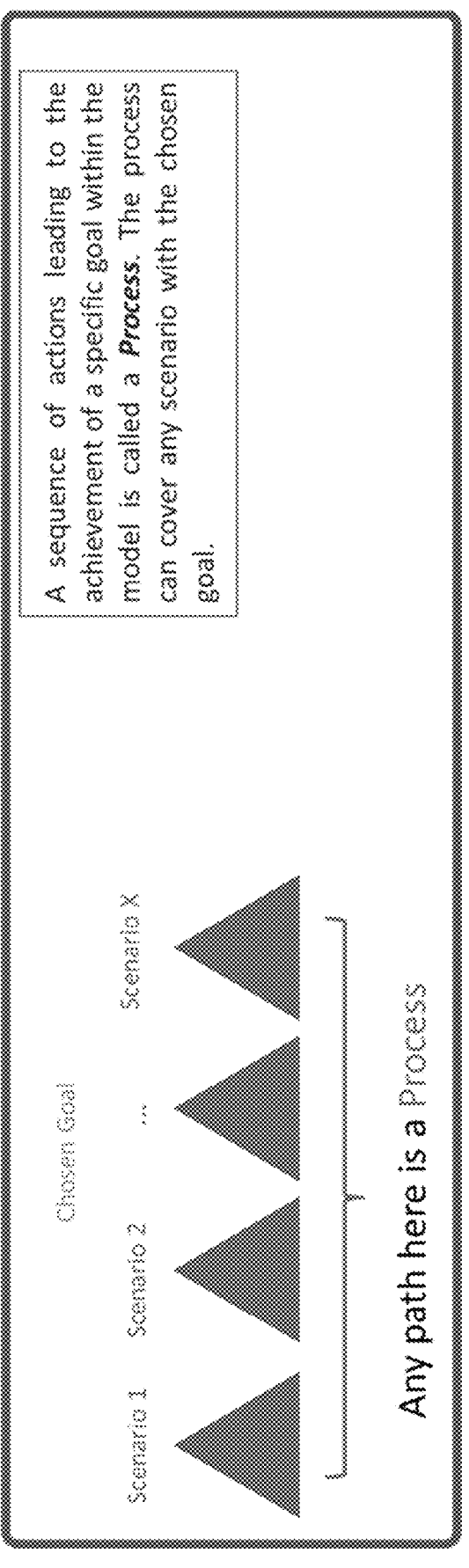
FIG. 6 illustrates a process in relation to scenarios in a business environment.
Figure 7:
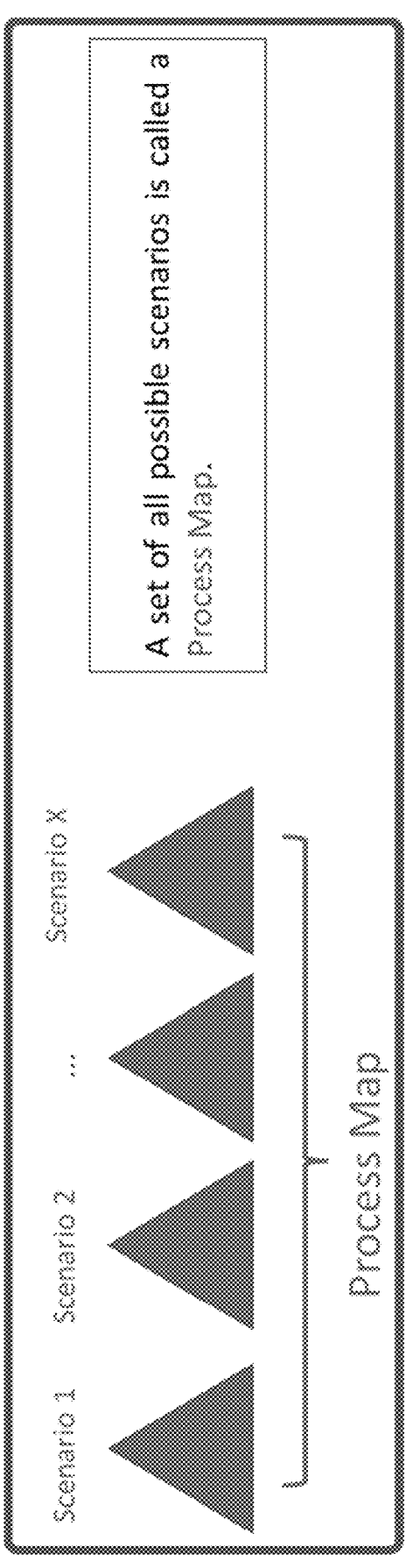
FIG. 7 illustrates a process map in relation to scenarios in a business environment.

A sequence of actions leading to the achievement of a specific goal within the model is called a Process (see FIG. 6). A set of all scenarios which covers as many goals as possible is called a Process Map (see FIG. 7). It will be understood that a Process Map can also be considered a Process. In embodiments herein, the system and method can be configured to continue to train while recorded data are analyzed.

Within the model, embodiments of the system and method make use of recognition rules, recognition outcomes and recognition outcomes. A Recognition Rule is a function or mapping applied to some activity to transform the activity's attributes or create new ones. Usually, rules are needed to clarify an activity's details or to emphasize some important information related to an activity. A Recognition Pattern is a combination of the Recognition Rule applied to an activity and the Recognition Output (or Output Set) of the Activity's attributes related to the rule. A sequence of recognition patterns driven by some business/scientific goal is called a Workflow.

Embodiments of the system and method herein are provided with a library of pre-configured Recognition Patterns and new recognition patterns can be developed for specific processes/cases in order to continue training the system. In particular, new recognition patterns can be directed at particular applications or activities used by employee users that do not fall into the pre-configured recognition patterns.

Figure 8:
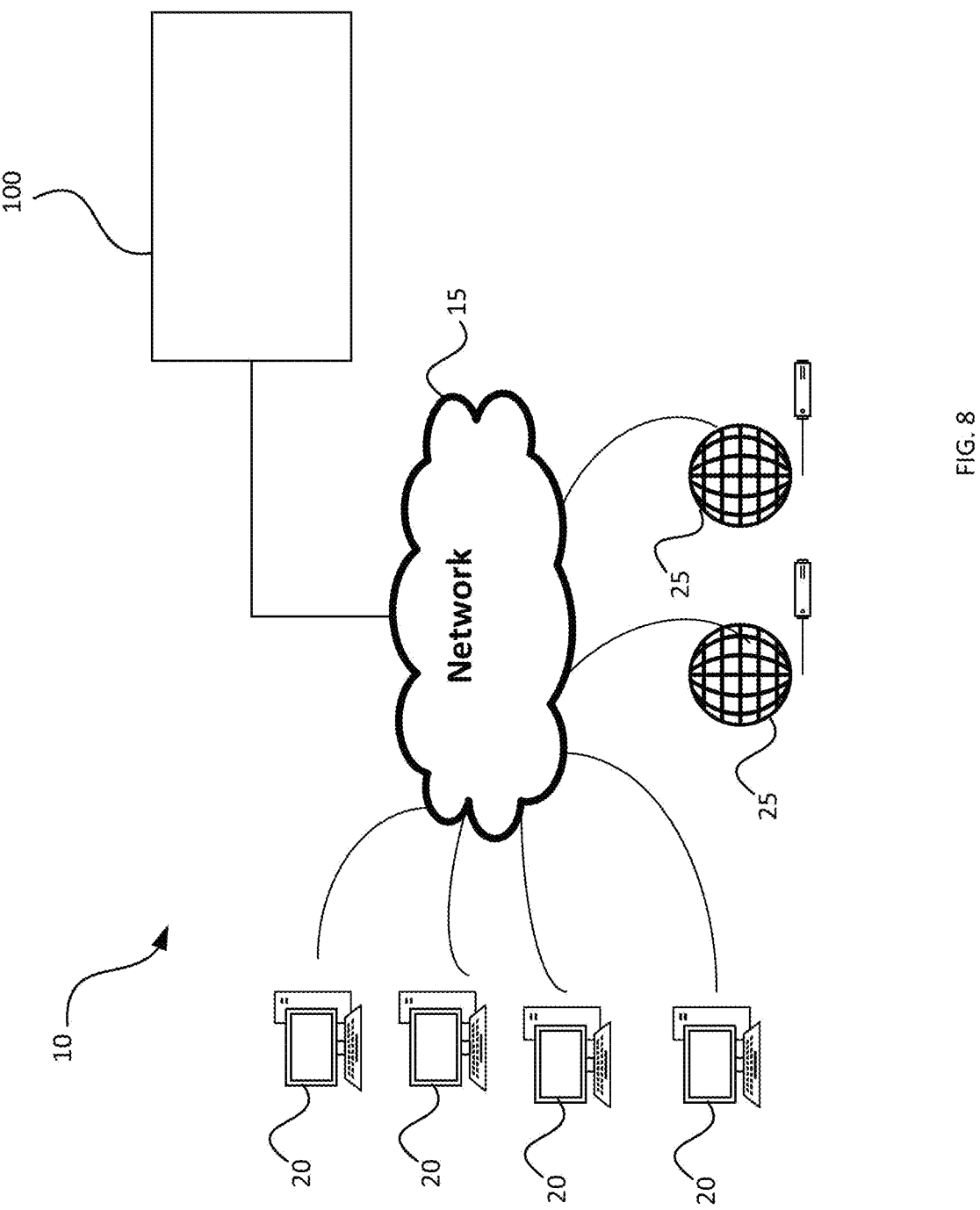
FIG. 8 illustrates an example environment for a process mapping system according to an embodiment herein.

FIG. 8 illustrates an example embodiment of an environment 10 for a process mapping system 100 according to one embodiment. The process mapping system 100 is connected to a network 15 that also includes various employees accessing the network 15 via computers, laptops, digital devices or the like (generically referred to as employee computers 20). The employee computers may also be communicating and interacting with servers of various types 25 via the network 15. The process mapping system 100 monitors activities of the employees on the computers 20.

Figure 9:
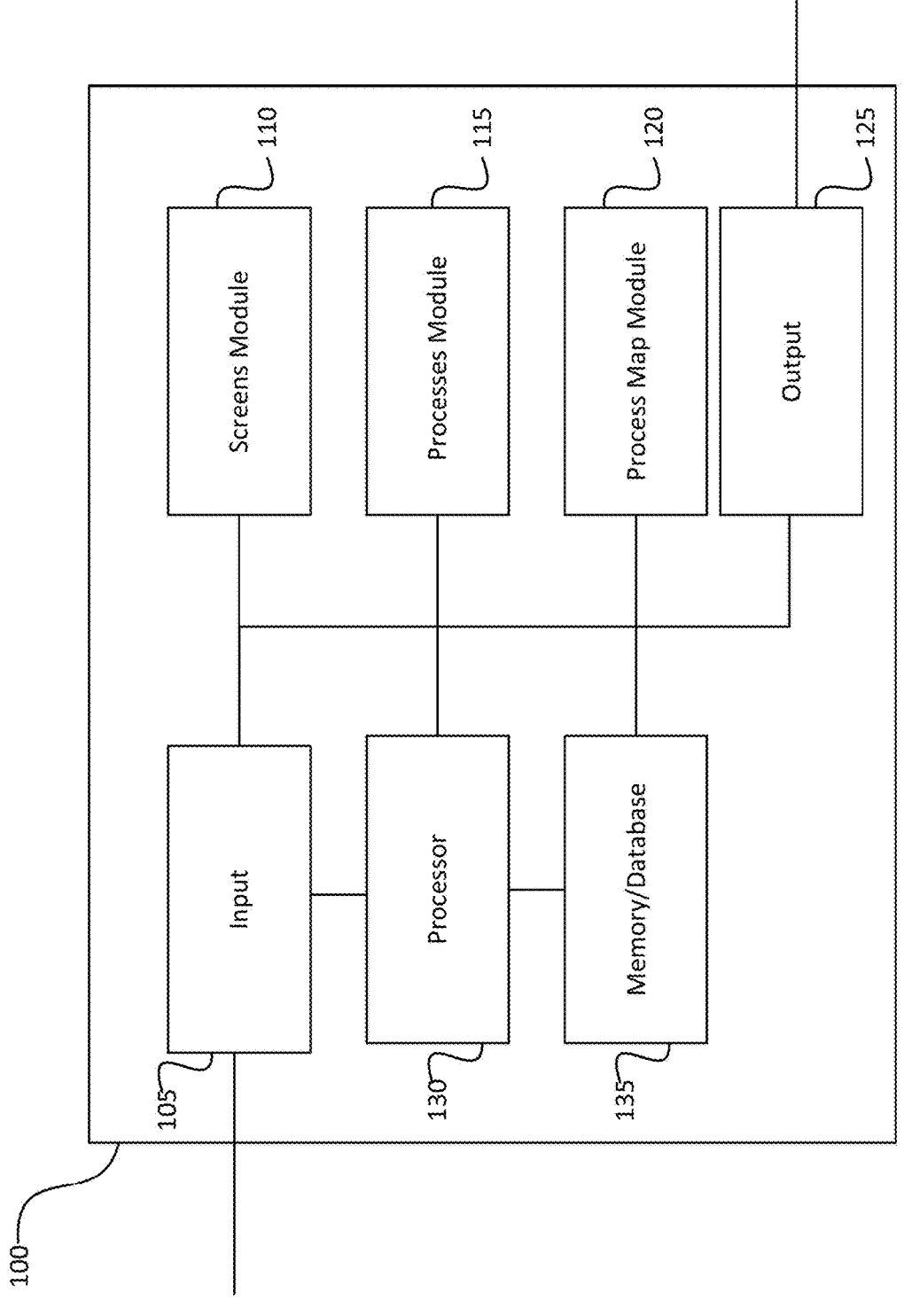
FIG. 9 illustrates a schematic drawing of a process mapping system according to an embodiment herein.

FIG. 9 illustrates an embodiment of the process mapping system 100. The process mapping system 100 includes a number of components or modules, including an input module 105, a screens module 110, a processes module 115, a process map module 120 and an output module 125. The process mapping system 100 also includes one or more processors 130 and one or more memory/database modules 135. The processor 130 and memory/database module 135 work with the other modules to provide the functions of the process mapping system 100. For example, the processor 130 can be configured to receive, via the input module 105, data (e.g., screen shots, HTML or other data) based on screens displayed and actions/events on the one or more computing devices 20 using the network 15. The processor 130 then stores the data in the memory/database module 135 and works with the screens, processes and process map modules 110, 115, 120 to prepare a process map that can be output through the output module 125. It will be understood that the elements of the process mapping system 100 may be local or distributed and that the processor, memory/database module and other modules may be hosted on a plurality of computing devices. The memory/database module 135 (sometimes called a data storage device) may include a relational database (such as an SQL database), or other suitable data storage device.

In some cases, the process mapping system 100 may also have one or more backup servers (not shown) that may duplicate some or all of the data stored on the data storage devices. The backup servers could be located at a remote storage location and the system 100 could connect to the backup server using a secure communications protocol to ensure that the confidentiality of the data is maintained.

Figure 10:
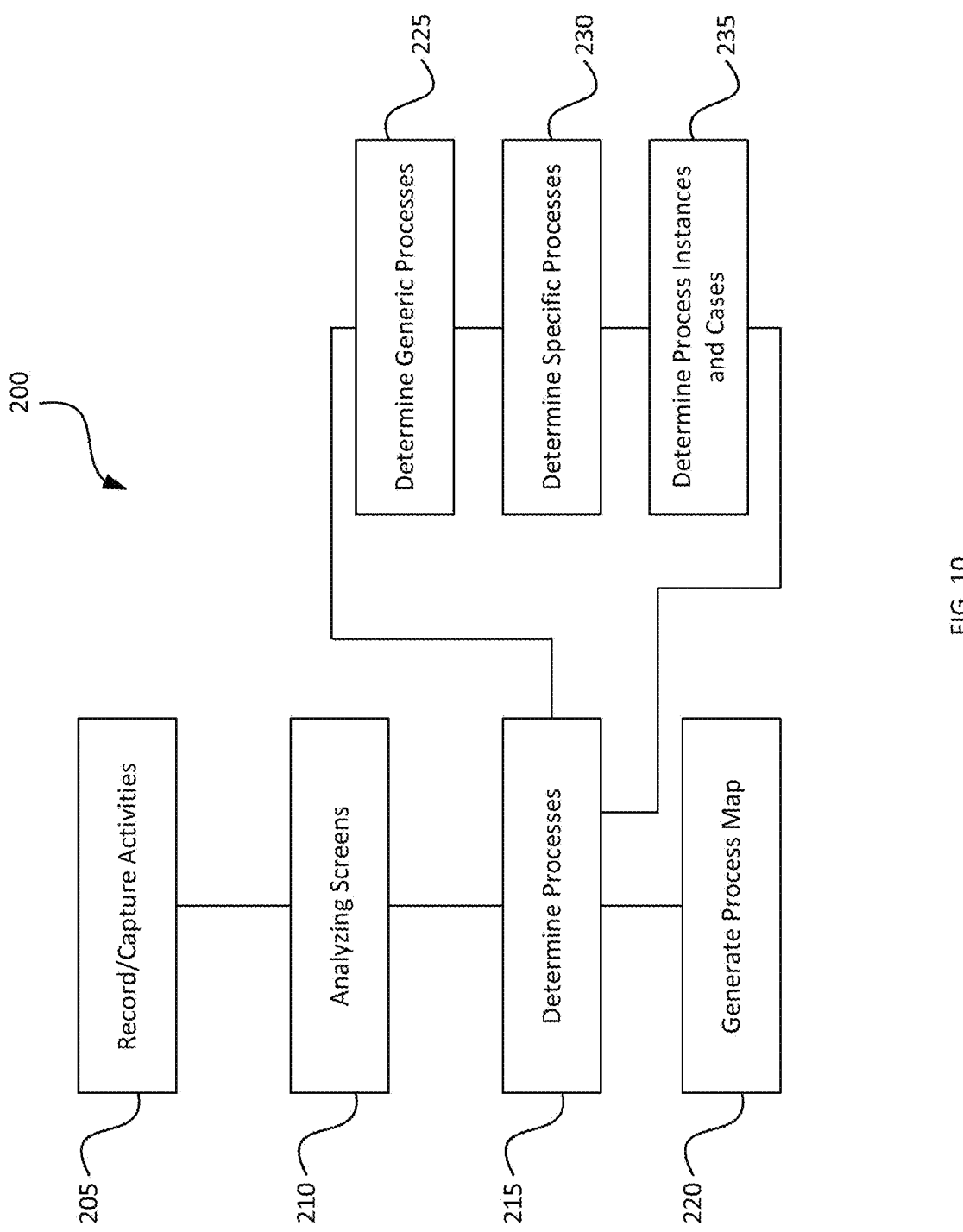
FIG. 10 illustrates a method for process mapping according to an embodiment herein.

FIG. 10 illustrates an embodiment of a process mapping method 200. The process mapping method 200 begins with capturing activities of the employees on their computing devices, at 205, using, for example, an input module. The capturing the activities is carried out using a web-based connection and without a software package on or administrative rights to the employee computing devices. The captured activities are then analyzed to determine additional data about the screens viewed/used by an employee ("activity data"), at for example, a screens module, at 210. The screens and any related metadata or the like are then analyzed to determine processes at 215 using, for example, a processes module. The determined processes are than combined into a process map at 220 using, for example, a process map module. Although not shown in FIG. 10, the results can be output via an output module.

As shown in FIG. 10, the determine processes stage at 215 can include three stages of: determine generic processes 225 (sometimes called L1); determine specific processes 230 (sometimes called L2), and determine process instances and cases 235 (sometimes called L3). Each of these stages are described in additional detail below.

Embodiments of the system and method make use of and/or record activities of the employee users by monitoring screens and actions taken on screens. In particular, the input module and/or screens module may record the activities and save the recorded data in the database. The recording of employee user data in embodiments herein is different from conventional recording systems, in that embodiments herein accomplish recording all activities of the employee user (one or many) interacting with a computer without installing desktop recording software on the computer and also without need for Administrator-level access to the computer being captured.

A Screen Recording module can be launched by the employee user on any workstation, physical or virtual, by opening a Web browser, typing a URL, and choosing "Record" as illustrated in FIG. 11. Once activated, the screen recording module captures and synchronizes several sources of information, for example, (1) User Screen Images, (2)

Figure 12:
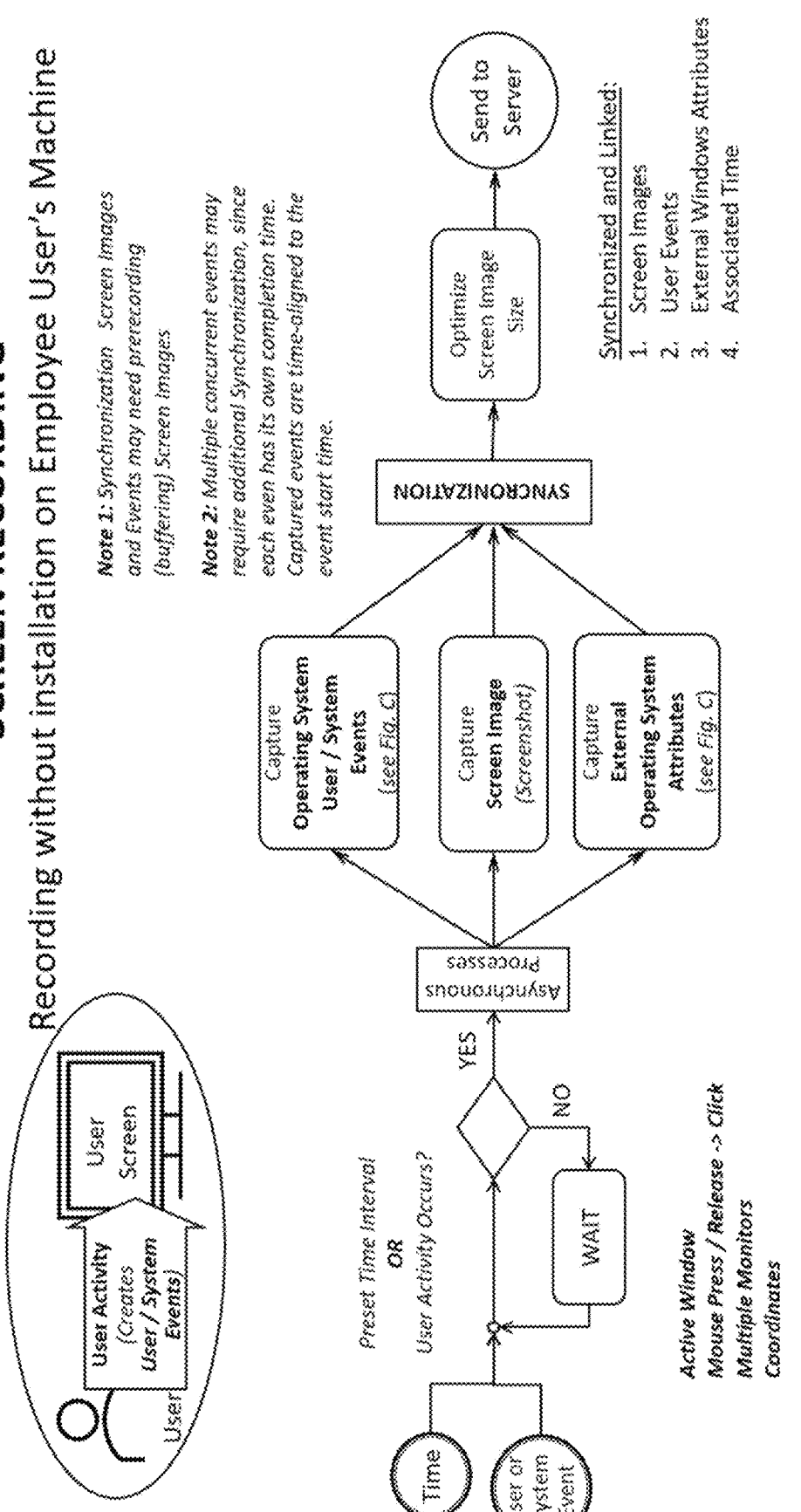
FIG. 12 illustrates an embodiment of a method for screen recording.

External Operating System Attributes, and (3) User System events, as illustrated in FIG. 12. These input sources are recorded without software installation on the computer and without Admin-level access. While each of these sources on their own may provide only partial or potentially unreliable information regarding the employee users' computer activities, a combination of two or more of these sources can provide sufficiently accurate recognition results. FIG. 13 illustrates an example of obtaining External Operating System Attributes and User/System events in a standard MS-Windows™ operating system. It will be understood that the screen recording module can feed into the input module or can feed into or be a part of the screens module.

An embodiment of a Screen Recording module for MS-Windows may include the following functional modules:

1. Event Listener module—Listens and records three levels of events: (Low Level, MSAA/UI automation, Application-Specific events) and populates event queues. Determines if the event is triggering and posts special request to a State Recording module. Event Listener is responsible for gathering employee user side of an interaction. In addition, Event Listener is responsible for hooking/unhooking of events for related active applications.

2. State Recording module—can be invoked at a predetermined time interval and/or can be invoked after a triggering event (possibly with some modifications). State Recording is responsible for recording data on the computer system side of user-system interaction, for example, capturing the internal structure of the screen (active window or window under the current event) and populating related recording variables corresponding to External Operating System Attributes shown in FIG. 13. This module can include specific extensions for various standard software packages such as browsers, Excel, Access, Windows Console, Attachmate, .NET/MSAA applications, and the like. The state recording module can also check for general state indicators for the employee user's computer such as microphone, sound usage, event activity, as well as any meta-data about employee user actions.

3. Screenshot Capture module—can be used by both Event Listener and State Recording modules to take a screenshot of a window (or part of a window) related to the events or actions being conducted.

4. Real Time Recording Rules Evaluation Module—module that evaluates data/information captured in recording and modifies it in real time according to predetermined Rules. For example, this module can be used to find and remove private data or other sensitive information captured in recording.

5. Information Transfer Module—responsible for sending or storing recorded information on the server and or browser. One possible implementation is to send screenshots directly to a server in encrypted format via HTTPS protocol. To optimize the use of network resources the module can reduce the amount of image data being transferred by: reducing the color richness and resolution of the images and/or transferring only parts of images where changes occur and recombining these parts with images transferred before, thus obtaining same result as if the entire image was transferred.

The Screen Recording module produces recorded data (which can be stored in a database) including: Screen Images with Associated External Operating System Attributes, User and System Events and Time Stamps. These recorded data become the input for the analysis in the following stages of embodiments of the system and method described below.

Figure 14:
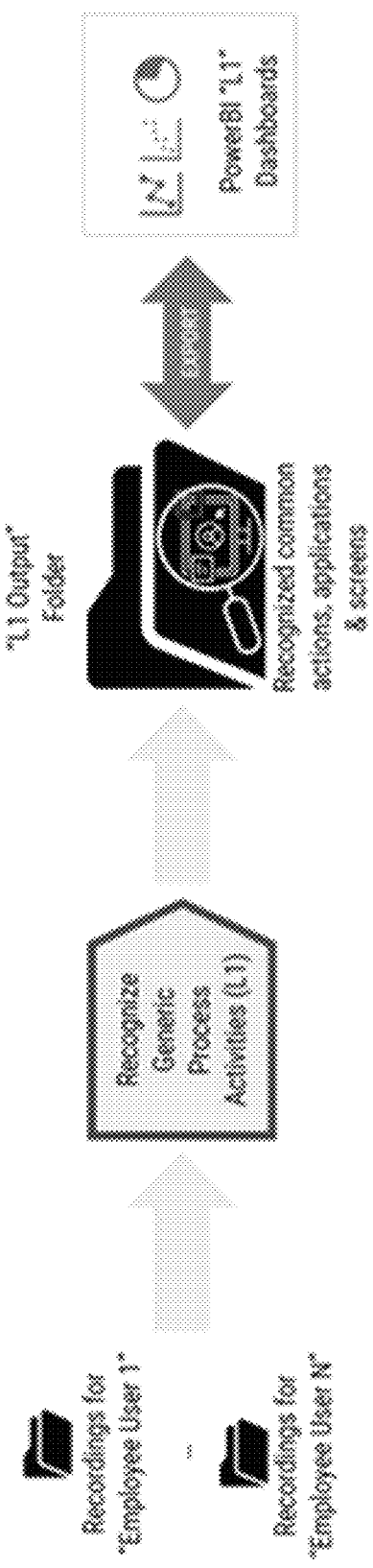
FIG. 14 illustrates a determining generic processes stage according to an embodiment herein.
Figure 15:
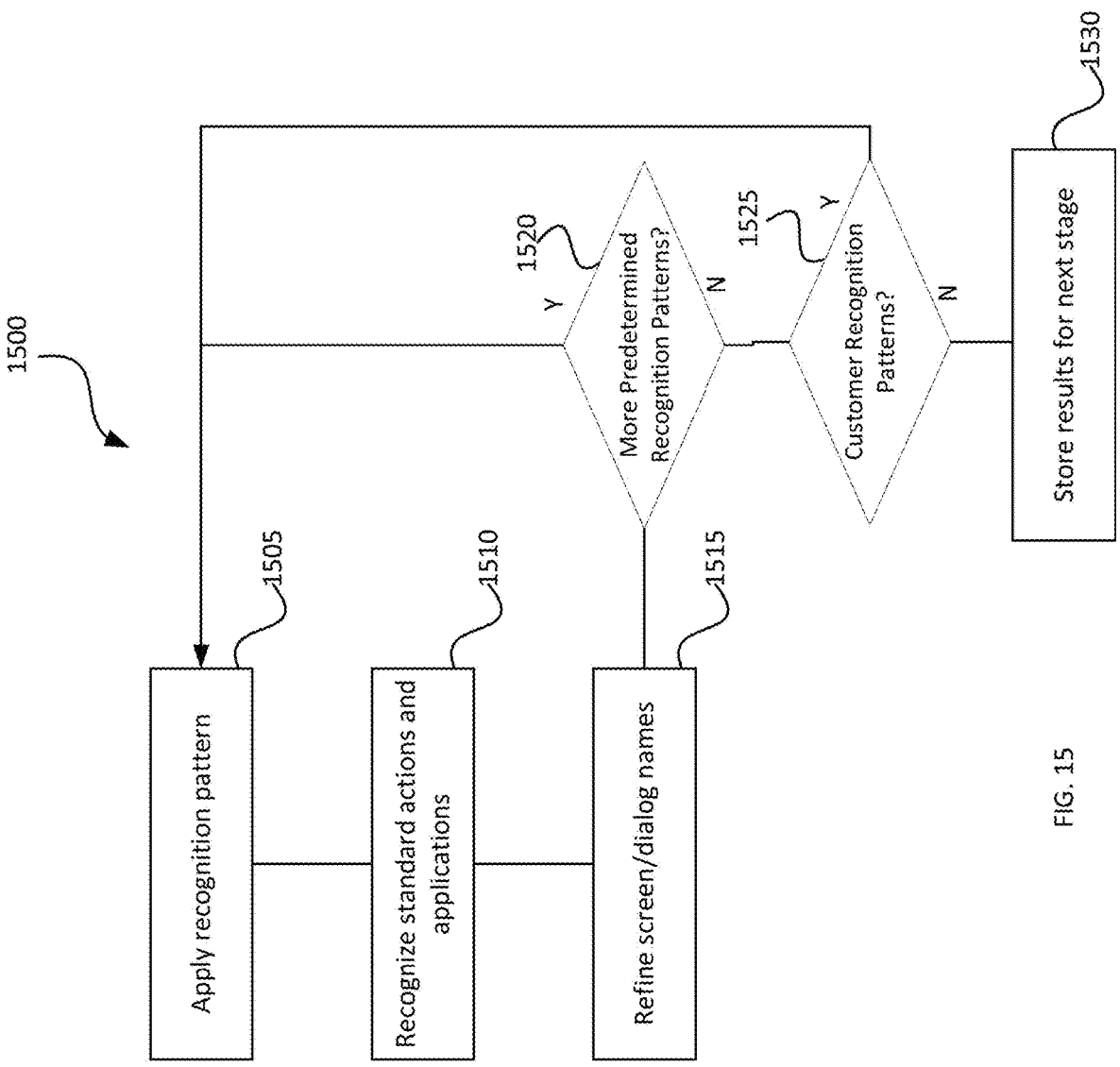
FIG. 15 illustrates a method for determining generic processes according to an embodiment herein.

Once recorded data is available, the system/method move into the recognition of generic processes stage ("L1"), illustrated in FIG. 14. FIG. 15 illustrates an embodiment of a method 1500 to determine generic processes. In order to recognize generic processes, the system performs automated analysis of Employee User's recorded data. During this automated stage, the system recognizes standard actions performed by the employees on their desktops as well as standard applications (such as MS-Office, Email, and many others) and screens they interacted with. Then the system stores the results in a "generic process Output" folder in the repository. The recognition results are visualized in dashboards for further validation, if required.

Once employee users have completed the recording, a user initiates "generic process Recognition" by applying, at 1505, a pre-defined set of a library of recognition patterns which automatically processes the recording and produces, at 1510, a data log with recognized attributes of activities such as Applications, Screens and Events. The data log can be further analyzed, using, for example, artificial intelligence tools or the like, to refine screen/dialog names, at 1515. The system proceeds through application of all pre-determined recognition patterns at 1520 and then proceeds through any customer specific recognition patterns at 1525. The method then stores the results at 1530.

For the generic process stage, the library of recognition patterns can be pre-defined based on previous activities of various computer users, either in a specific industry or more broadly across a range of industries.

The "generic process Recognition" stage makes use of the concept of Workflow, which enables application of multiple sets of Recognition Patterns to be executed, for example, sequentially. The Workflow applies a set of Recognition Patterns on top of the output generated by a previous set of Recognition Patterns. The "generic process workflow" applies several Recognition Patterns set of standard libraries over employee user's recordings. The "generic process Workflow" includes:

1. Generic Recognition Library-recognizes all standard actions and applications (ex. MS-Office)
2. Conceptualizer-intelligently refines screen/dialog names
3. Customer Specific Library-recognizes customer specific applications and actions after Generic Recognition Library and Conceptualizer have been completed (if applicable)

Embodiments of the process mapping system and method, such as the screens module, screen analysis and/or conceptualizer, may also utilize artificial intelligence tools, such as large language models or the like. For example, artificial intelligence (AI) tools can be used to better analyze recorded screens and related data. In particular, AI tools can be used for:

Data recognition and Identification (for example, assign Data Names/Titles to recognized data values Ex: "Name"→Alex)

Figure 16:
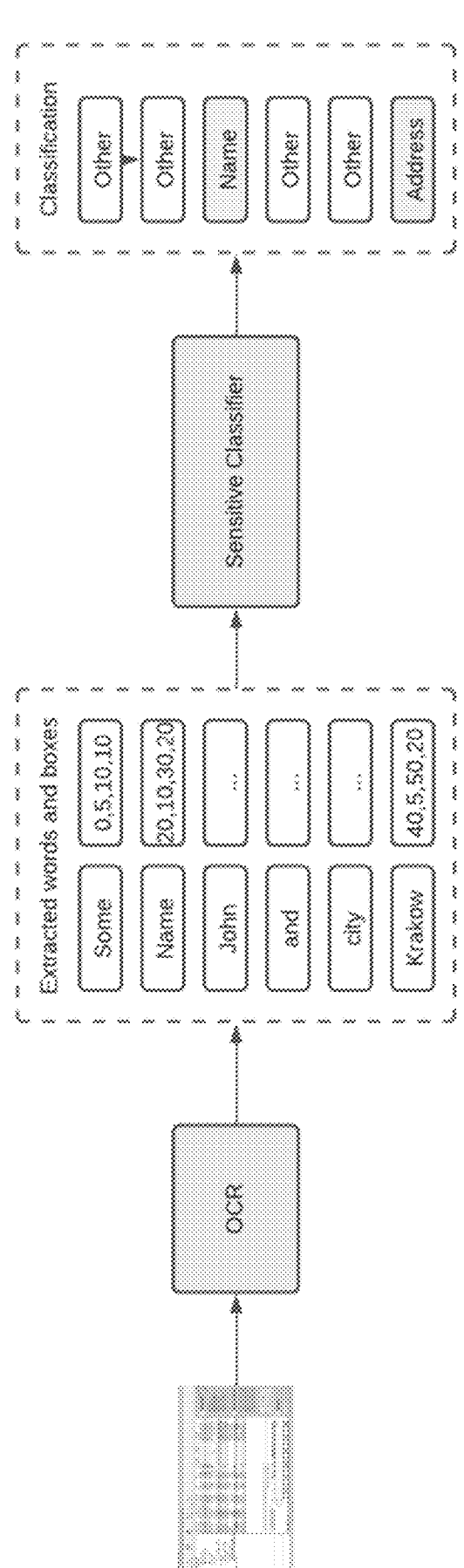
FIG. 16 illustrates an example of classification of sensitive data for sensitive data obfuscation.

Sensitive Data Obfuscation (for example, flagging, deletion or substitution of personal, sensitive, critical data or the like such as name, address, Credit Card number, health card information, or the like) (See FIG. 16)

Figure 17:
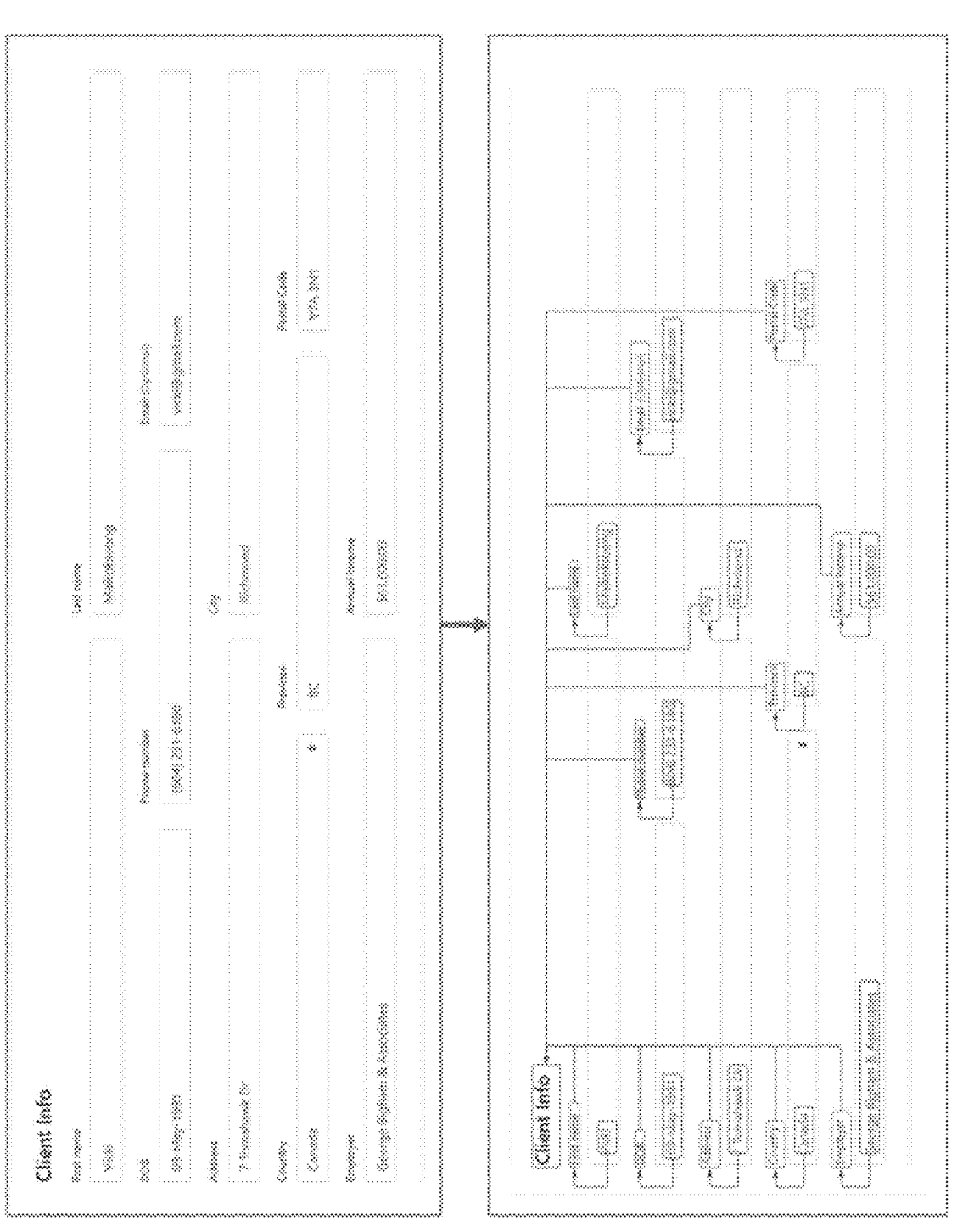
FIG. 17 illustrates an example of determining a data hierarchy of a recorded screen.

Discovery of Screenshot Data Hierarchy (for example, Client Info→First Name, Last Name etc) (See FIG. 17)

Figure 18:
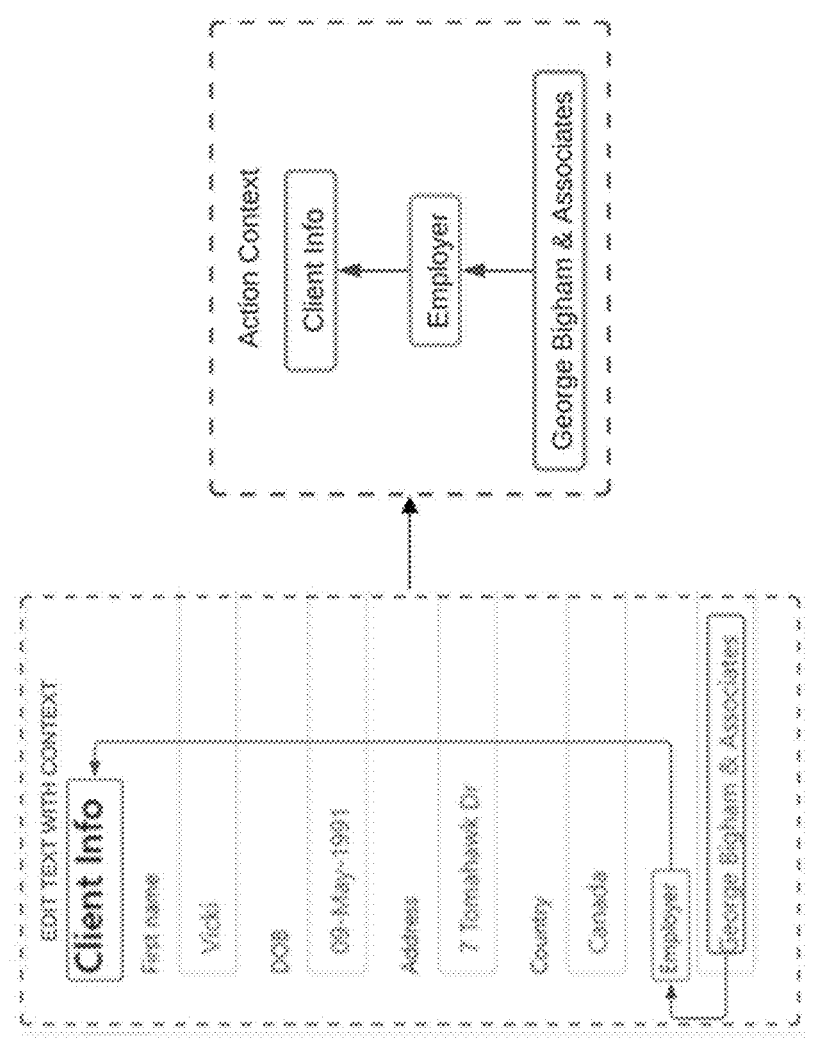
FIG. 18 illustrates an example of determining the context for a data entry on a recorded screen.

Business interpretation of clerk (employee) mini actions. (for example, determining the context when an employee/clerk enters "employer" name to "Client info" section) (See FIG. 18)

Conceptualization of a group of mini actions into business activities (Large Language Model) (for example, from series of clerk actions→Clerk enters new Client Information)

After generic process Recognition, the results can be stored in a separate folder or the like. Once the generic process stage has been completed, the results, such as recognized applications, screens, actions, and the like can be used to supplement or extend the recognition library to recognize screens and process specific applications.

Figure 19:
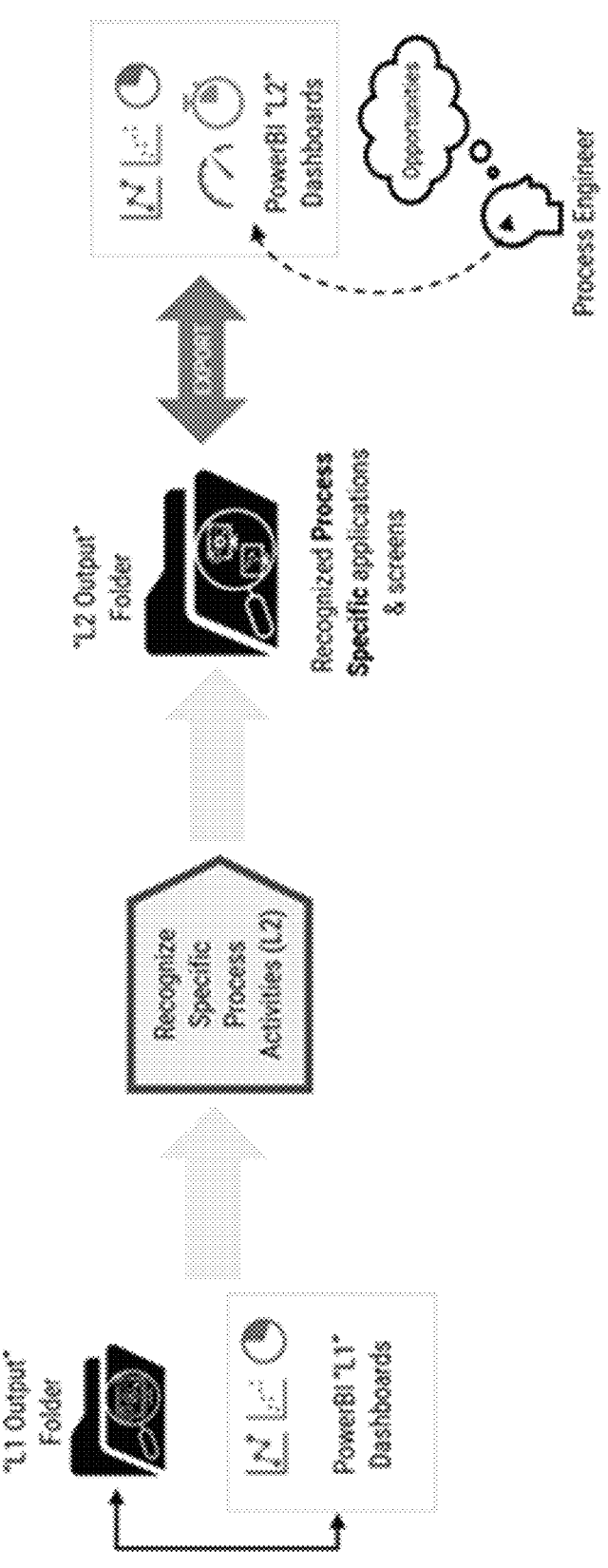
FIG. 19 illustrates a determining specific processes stage according to an embodiment herein.
Figure 20:
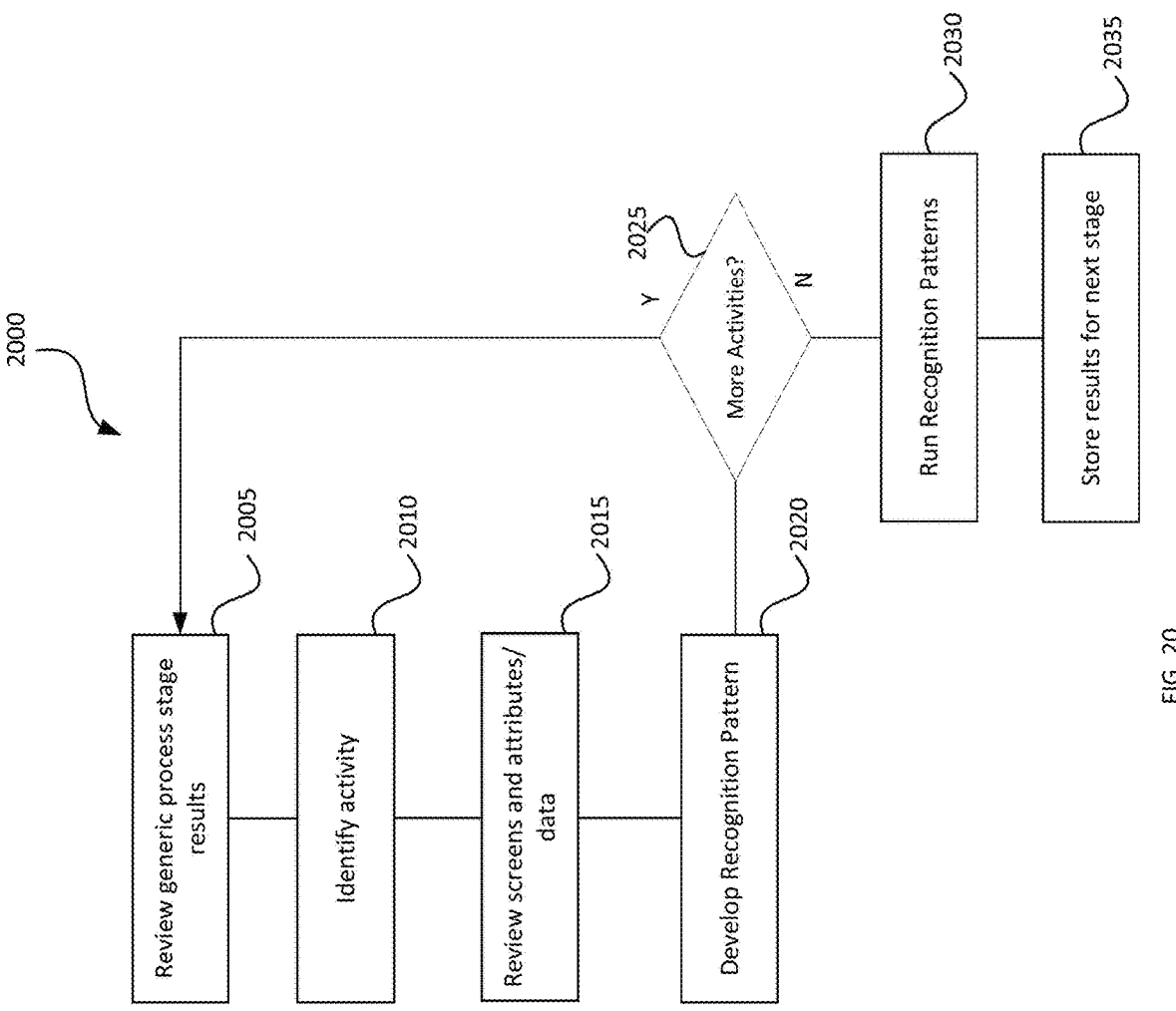
FIG. 20 illustrates a method for determining specific processes according to an embodiment herein.

Once generic processes have been analyzed, the system/method moves into the recognition of specific processes stage (sometimes called "L2"), illustrated in FIG. 19. FIG. 20 illustrates an embodiment of a method 2000 to determine specific processes. The specific process recognition stage also makes use of the concept of Recognition Patterns. A Recognition Pattern generally includes a "Recognition Rule" and a "Recognition Output". A Recognition Rule instructs the system how the encountered applications, screens or events during recording should be recognized. Each Recognition Rule can include one or more logical instructions based on attributes located in a "Recognized Attributes" window, captured by the system during recording (or obtained from OCR before or after recording), such as Application Name, Title, URL, Events (like Mouse Clicks, Keystrokes, etc.), other advanced metadata (Browser Hash), OCR'd Objects (FullText, Words & Phrases), and many others. For example, a Recognition Rule can instruct the system to recognize an application such as "TaskQue" when the URL parameter contains "taskque.com".

A Recognition Output defines an output pattern of the recognized activity which manifests in a log resulting from Recognition Pattern application. The output pattern consists of elements which describe the recognized activity. The output patterns generally contain the following elements: Application, Action, Screen, Subscreen, Dialog, which may vary slightly and contain some additional elements depending on the recognition stages (L1, specific process or cases process).

For instance, a specific process Recognition Pattern with Recognition Rule from the example above will result in the following Recognition Output line in the log where "Application" element has been updated to display "TaskQue".

| Pattern Elements> | Prefix | Application | Action | Screen | Subscreen | Dialog |
|---|---|---|---|---|---|---|
| Log Entry >>> | . . . | TaskQue | Review | Loan Application (ID-0172) | . . . | . . . |

The Recognition Output can also be used to extract data from an activity's attribute or screen object and output it to the log. This can be useful during the specific screen recognition step. In the above example, the Recognition Output can be refined further and will dynamically extract a certain screen name (or correct the originally extracted screen name during generic process stage), so the resulting specific process output log may finally look like this:

| Pattern Elements> | Prefix | Application | Action | Screen | Subscreen | Dialog |
|---|---|---|---|---|---|---|
| Log Entry >>> | . . . | TaskQue | Review | Dashboard | . . . | . . . |

Each activity/log entry will include time metrics, as a result it can be visualized in the form of analytical dashboards once ingested by the BI tool.

In the specific process recognition stage, the method 2000 to determine specific processes begins with a user reviewing the analytics generated after generic process Recognition stage and picks activities that were not fully recognized or require further refinement. The user creates new Recognition Patterns to recognize the identified activities and apply these patterns to get a comprehensive output log. The results of specific process recognition can be stored in a separate "specific process Output" folder in the system repository.

Based on the generic process stage data log, the user creates new Recognition Patterns by reviewing the generic process stage results at 2005 and then picking activities (candidates) for certain specific applications and/or screens that were recognized as "Generic" or "Web" applications (labeled accordingly in BI reports) or require further refinement at 2010. The user can gather such activities into a collection for which a set of Recognition Patterns will be created. To begin creating new Recognition Patterns, a report based on generic process data can be generated.

The following steps illustrate an example of how to create new Recognition Patterns.

1. Review and Identify activities (candidates) for Recognition Patterns in a dashboard at 2005, 2010. For example, look for the applications labeled with "[WEB]" as well as "N/A". The applications labeled as "[WEB]" could be important process specific web-based applications that were recognized by generic process Recognition stage as generic web applications and may require more precise recognition. "N/A" represents applications that failed to be recognized by generic process Recognition stage and require further review to determine their importance.

2. Expand the most time-consuming application and review its screens at 2015. For example, if the screen name provides meaningful data, the user can change the application name only during Recognition Pattern creation (for example: "127.0.0.1 [WEB]" may be replaced by some meaningful name i.e., Loan Management System or in short "LMS"). Alternatively, further instructions in Recognition Output pattern can be added to enhance the screen recognition (if required).

3. Once the application and screens requiring new Recognition Pattern have been identified, the user can filter for the desired application, and reviews its attributes variation. A dashboard can help the user to identify the attributes (AppType, Title, URL) or a combination of attributes to be used when creating Recognition Pattern at 2020 to achieve the desired recognition. For example, the user may observe that the "url" represents the best attribute based on which an application can be recognized, if all variations use it as a standard pattern. It can be useful if the dashboard shows all of the unique occurrences of the applications and screens and sorts them in a descending order from the most to the least time consuming.

4. This process can be repeated for any remaining activities that require a recognition pattern at 2025. In some cases, the user can create the new recognition pattern from a previous similar activity, recognition pattern, or the like. For example, the user can select an activity value from the list and the system will display a location in the system enabling full traceability. A user can jump to the location and then select a Collection where the activity will be stored (ex. Recognition Patterns). The user can then select recognition pattern items for editing as necessary.

As a part of the specific process recognition stage, the user can teach the system to recognize recognition patterns automatically. As an example, the user may select output type depending on the task/stage. For example, an "OCR All" output type could be selected in case the user wants to create a rule to perform OCR on all activities, etc. At this point, the system may also display a Rules Editor window where recognition rules can be edited/defined for the recognition pattern. The recognition rules can be defined based on a variety of attributes captured by the system during recording. The User can decide what type or combination of parameters to be used during rules creation to accurately teach the system to recognize a particular activity. All the captured metadata is stored as "Recognized Attributes" can be accessed to assist with this process.

For example, recognition rules can be based on Main Data which includes, for example, the "Application Type", "Title" and "URL". Based on these parameters (or their combination), the User can teach the system to recognize certain applications and certain pages or screens within those applications that the Employee User was working on.

Consider an example of creating a Recognition Rule based on URL parameter. In this case, the system may identify a URL for a Generic Web Application and the goal may be to create a specific Recognition Pattern that will define this further and recognize this URL and related as a single application. The user can select the relevant part of the URL and designate it as the URL for the designated application. The user can then complete the "Recognition Output" for the recognition rule to complete the Recognition Pattern.

Once new Recognition Patterns have been created for the specific process recognition, a process very similar to the generic process recognition stage can be repeated with the new created recognition patterns at 2030. As a result, the system will recognize specific applications and screens and output them in a structured way to the resulting specific process log at 2035.

In processing Recognition Patterns in general, it can be helpful to deploy Optical Character Recognition (OCR)-based patterns to recognize text objects on the screen. The resulting OCR'd attributes can be used to extract certain screens, sub-screens or actions where other metadata captured by the system is insufficient to provide the desired results. OCR can also be used to extract data from the screens for later processing. When setting recognition patterns, the user can specify OCR depending on the particular screen, application, or the like. The user can specify whether to OCR an entire screen (possibly with some exceptions) or be more selective and just OCR triggering events (such as mouse clicks, adding/editing text, or the like) or the like. Since OCR can be a resource intensive operation, these settings may be adjusted depending on computing power, may be scheduled to run at off peak timing, or the like. As noted above, AI tools can be helpful in conducting OCR operations.

After the specific process stage has been completed, the system can begin to provide powerful operational insights.

Various employee's operations can be visualized, and improvement opportunities can be identified even prior to detailed case-level understanding of the process. Patterns on how employees use messengers, text-based applications, time tracking applications, can indicate potential process waste (i.e., search, validation, reconciliation) or operations that can be automated or improved. Generally speaking, a review of the specific process output allows for recognition of various employee operations related to Email, MS-Office, other standard applications, and even some more specific operations that have been assigned Recognition Patterns. Further insights can be obtained by mapping processes to provide a more detailed visualization of "Operations" and "Sub-Operations" of specific applications used by employees.

In the cases/instances stage, the user extends existing mappings with new content for specific applications and applications that were visualized as, for example, "Other Activities" by the specific process dashboard. As one example, if the specific applications recognized during specific process stage have not been mapped, they will be classified as "Other Activities".

In this stage in particular, the name for operations and sub-operations should provide as much business context as possible depending on the project/process. As an example, it is possible to use a combination of verb (to describe what was done) and noun (typically an application name), for example: "Manage Email". Similarly, the mapping can be defined for sub-operations based on groups of screens.

The cases/instances stage begins with identifying which applications should be selected for mapping, generally based on the amount of time spent in each application. If there are applications and screens where operational meaning is uncertain, the user can locate the application & screen occurrence in the database and review activities/screens to the left and to the right of the found occurrence, i.e., walk-through the potential case or fragment to better understand the operational meaning to be mapped. If the mapping is still not apparent, the user can update the Recognition Patterns to provide a more meaningful/detailed Screen recognition or seek additional input on the use of an application/screens from an operational perspective or defer the mapping until a later stage. It will be understood that the user may iteratively update the mapping file as more operational knowledge is obtained throughout the project stages.

Figure 21:
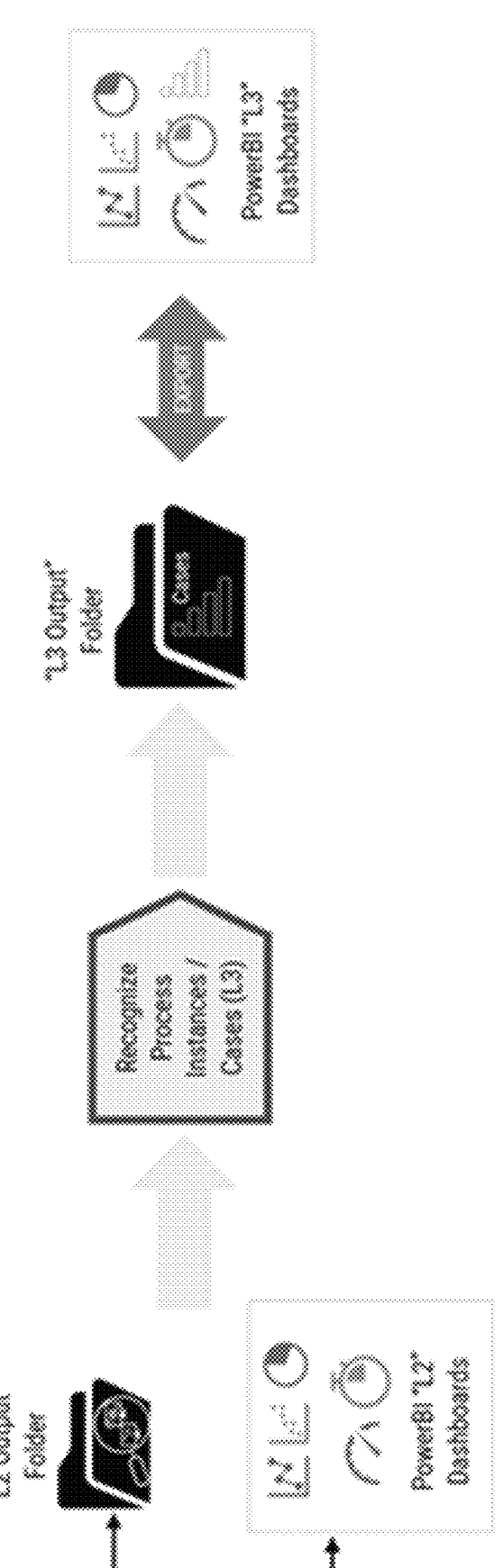
FIG. 21 illustrates a determining process cases/instances stage according to an embodiment herein.
Figure 22:
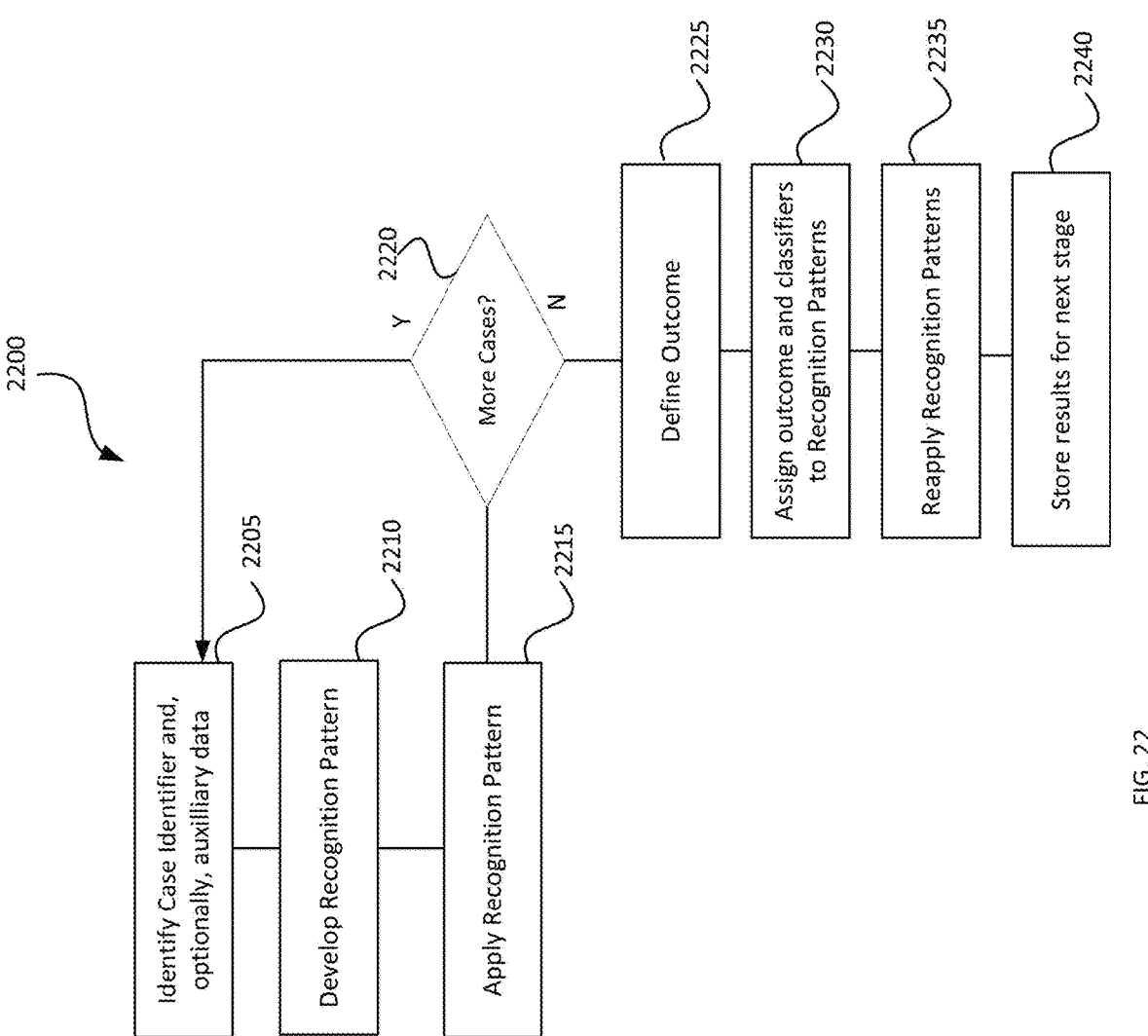
FIG. 22 illustrates a method for determining process cases/instances according to an embodiment herein.

In this stage, the system allows for Recognition of Cases and Scenarios (sometimes called "L3" or "cases process stage"), as illustrated in FIG. 21. FIG. 22 illustrates an embodiment of a method 2200 to determine instances/cases and scenarios. The cases process stage allows the system to automatically recognize Cases and Scenarios, and their execution outcomes.

The cases process stage uses an algorithm which analyzes data from "specific process Output" folder and automatically breaks it into cases ("Automated Cases Recognition Feature"). The recognized cases are "published" to a further project folder, which can be used later for analytical reporting.

The user initiates the cases process stage by identifying case identifiers (key data) at 2205 so the system can determine where each case begins and ends. The case identifier is generally data that uniquely identifies or characterizes a case. For example, such data may be a unique ID used by an employee in performing business process steps, such as a phone number, email, Social Insurance Number (SIN), Loan ID, or the like, depending on the process.

In some cases, other key data (also known as Secondary or Auxiliary Data) can be used to assist the algorithm to make better decisions on the case boundaries. For example, if the Primary Identifier is an 8-digit Customer Number, then an Auxiliary Data could be customer's First and Last Name.

Once the key data has been identified, a user can define a Recognition Pattern for the cases at 2210 by defining a Recognition Rule to identify the Activity and defining a Recognition Output that will extract the Key Data (Case Identifier) and auxiliary Data (Supplementary data that helps to identify the case). The Recognition Pattern will then be able to extract the Key and Other Data.

In some cases, the Recognition Output can include additional features to enable acceleration of Recognition Patterns creation and validation. For example, software code (sometimes called "wizards" or "macros") can be provided to perform on-the-fly validation visualizing data "to be extracted" in real-time, without the need to apply a Recognition Pattern. Similarly, the user may use copy/paste instructions and/or editing to re-use existing Recognition Patterns or the system may automatically convert "legacy" recognition rules/patterns to the "new" Recognition rules/Patterns.

Once the cases Recognition Patterns have been created, the user can apply the cases recognition patterns to the data at 2215. The method can then check if there are more cases at 2220 and, if so, return to identifying case identifiers. In some cases, each recognition pattern for a case may be applied to the data prior to identifying another case. In other cases, a plurality of recognition patterns can be created for various cases before applying the recognition patterns to the data. In some cases, the cases Recognition Patterns can be applied to a subset of the data, such as one working day for a single employee user or the like. Once processed, the system can display a dashboard with identified cases and their fragments. The dashboard may include a list of different cases along with their primary ID and display other information such as a gross vs. net time information which shows the difference between how long a certain case took to complete end-to-end (gross time), vs. how much work was actually performed on the case (net time) or the like. For example, processing a loan could take an approval cycle for 3 days until the decision is made (gross), whereas actual work that employees spend on processing the loan was 30 minutes (net).

Using the dashboard, the user can define a Case Outcome that describes what was the case's resolution, i.e., what goal has been achieved when the case was completed at 2225. In some cases, the system may also provide categories that characterize each case. In one example, the characterization categories may be flexibly used at the user's discretion but there may be a default to "Type", "Sub-Type" and "Scenario" or the like. For example, in a loan application process, the Case Outcome could be "Approved", "Declined" or "Review Required", whereas the case classifiers can include the type of loan (LOC, Credit Card, Mortgage, etc.), loan amount, or any other information that could be meaningful or important to understand about the case.

Once the case outcome and classifiers have been identified, the user can assign these to the case for future recognition at 2230. For example, the user may extract the outcome and classifiers from relevant screens and mark them so the system can access from Recognition Patterns In a situation where the data (such as case outcome) is not present in either metadata or screen, or the process is extremely complex and has no deterministic data available to describe the case outcome, the user can update the case manually in "Debug Mode" when going through the case in the dashboard.

As above, the Recognition Patterns can be re-applied at 2235 and the system will identify cases as well as update case's classifiers based on the extracted data. The user can also have the option to review and tune the Recognition Patterns or the like. For cases, the boundaries of the cases can be corrected (if required) and the case fragments can be merged if needed. In some cases, issues can be marked on a dashboard in red or the like so that the issues be reviewed and manually assigned to a case or ignored if not part of the in-scope process. The cases processes stage end by saving the data for the next stage at 2240.

In some situations, it may be difficult to identify key data that is to be used to differentiate cases. For example, some screens may include more than one key data item. In that case the user may create a "Specific" Regex that will only extract the correct Primary Key but will NOT be extracting other primary keys related to other cases. It is preferable if the "Specific" Regex has some sort of a unique anchor. For example, if the primary key is "ID-0167", the "ID-" represents a unique anchor within this specific regex. For example, some processes may contain more than one primary key, using a loan application example, the Loan Application ID and Customer's SIN #. The user should generally only extract and place multiple primary keys (each key using its own regex in the Recognition Output) only if these keys appear together on the same screen. In some cases, the user define a more generalized regex. For example, if the Primary Key defined initially was "ID-xxxx" (i.e., "ID-" and 4 digits), a generalized version can be defined as any 2 digits, then "-", and then 4 digits. In this case, the algorithm would treat both "ID-0167" and "1D-2342" as a primary key.

There may be situations in which a case consists of one or two short (timewise) fragments. Such "orphan" cases/fragments typically belong to some other neighboring case but have been separated, often due to OCR recognition quality or the like. The user can manually assign an "orphan" case to a neighbour by, for example, adding a Synonym, i.e. specify an ID that can be treated by the algorithm as a synonym to another ID. For example, a SIN #"123 456 789" can be declared/defined as a synonym for "ID-0167" and these will be assigned to the same "Case".

Embodiments of the system and method herein are intended to comply with privacy standards such as GDPR. As such, the system and method include mechanisms for data obfuscation, application green-listing and the like. As an example, in some embodiments of the system and method, support can be provided for three levels of data obfuscation to ensure prompt, irreversible masking of private and sensitive data.

Application-Level Obfuscation-providing ability to obfuscate the data at the recording level, based on the pre-defined list of green or red-listed applications. This method fully prevents the red-listed data from traveling to the system server from the Employee's desktop. For example, a user/data custodian can pre-define Recognition Patterns to green-list or red-list the required application. During the recording, the system will only transfer the data that was specified in the green list.

Screen Level Obfuscation—providing flexible ability to obfuscate the recorded data if it is determined to be private once it has already reached the system server.

Field Level Obfuscation—allowing to obfuscate specific field level data on each given screen, either based on a template or on-the-fly. This is especially useful during document generation phase to hide any sensitive private data such as social security, credit cards information, etc.

Figure 23:
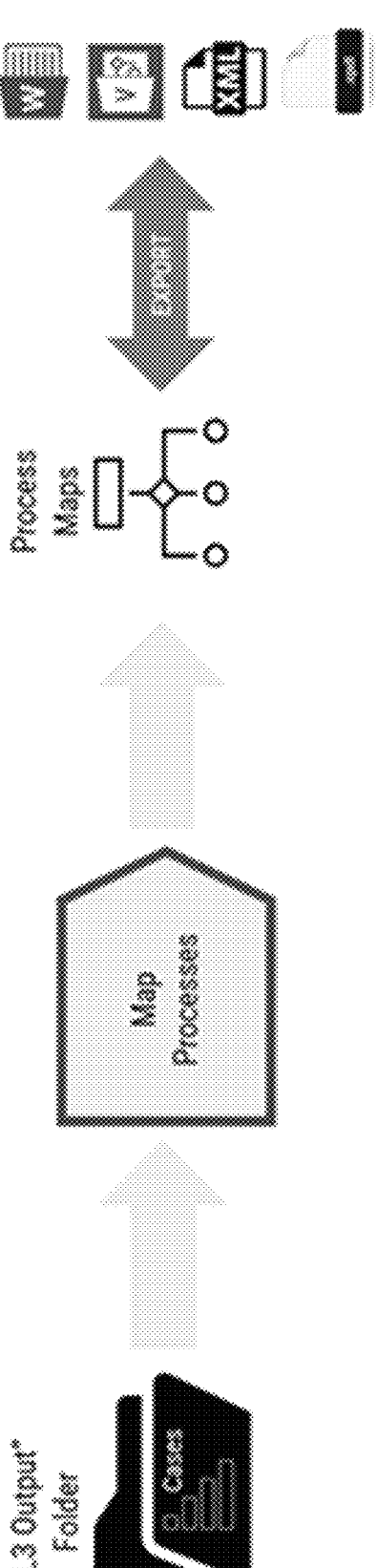
FIG. 23 illustrates a determining process mapping stage according to an embodiment herein.
Figure 24:
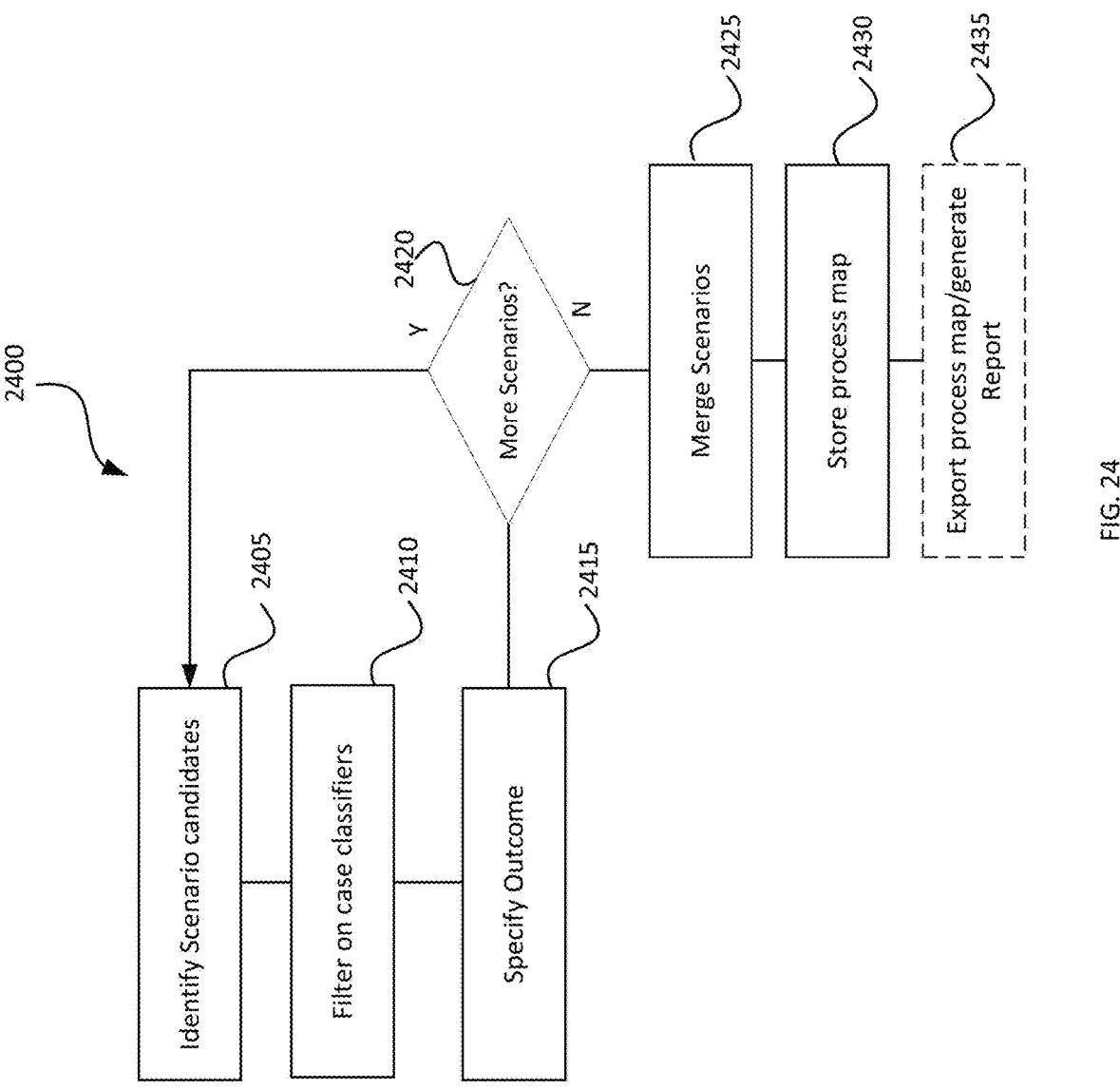
FIG. 24 illustrates a method for determining process mapping according to an embodiment herein.

Once the various processes (generic, specific, and cases) have been analyzed and identified the processes can be mapped to prepare an Integrated Process Map which is intended to show a broader or full picture of the relevant business processes. The process mapping stage is illustrated in FIG. 23 and FIG. 24 illustrates an embodiment of a method 2400 to prepare a process map.

The process mapping stage begins with selecting candidates for various scenarios at 2405. The scenarios are typically correlated with the case outcomes identified during case process recognition. The user selects the candidates by filtering on case classifier(s) and/or case outcomes to specify each of various scenarios at 2410. The user may further narrow onto a specific scenario by selecting additional attributes such as Applications, Screens and Actions. The user then selects/specifies an outcome at 2415. For example, the user could choose "Declined" as an outcome in relation to a Mortgage (MTG) loan application as a scenario. The system will then provide a list of cases matching the filter in a dashboard. The user can then review and edit the list, if needed. The candidate process can be repeated for other scenarios at 2420.

In some cases, the scenarios can be "pre-treated" to create a more compact flow by using a naming convention which will facilitate the process map review. The pre-treating can use AI tools (as referred to above) to reduce noise, provide more compact views and format activity's names to get them ready for process map construction.

The system then generates a Business Process Map by merging the scenarios together at 2425. The merger of the scenarios (process map) can itself be a process and may include branching steps, connecting and merging activities, sub-processes, and the like. For example, the merging of scenarios can involve comparing activities performed in each scenario having a different outcome and combining those that match while providing a separate path/process for those that do not match, including the eventual outcome.

Once the process map is completed, the process map can be stored at 2430. Further, the system can optionally export the Process Map/generate a report at 2435. The export/report can be in various formats (Word™, Visio™, XML™, BPM/XPDL™, and the like). Depending on the format, the system can be configured to include representative images/screens for activities, process steps and the like. The user can select a representative ("bookmarked") image to be exported. For example, the user can choose/bookmark an image/screen within an activity as a "representative" even though the activity contains 8 images/screens, or the like.

The ability to capture employee user information without a separate software package on or administrative rights to the employee user's computer combined with the staged approach, and unique aspects of each stage, are intended to distinguish embodiments herein from conventional process mapping systems and provide the benefits of fewer data privacy concerns and more accurate process identification and mapping.

In the preceding description, for purposes of explanation, numerous details are set forth in order to provide a thorough understanding of the embodiments. However, it will be apparent to one skilled in the art that these specific details may not be required. In other instances, structures may be shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device and can interface with circuitry to perform the described tasks.

The above-described embodiments are intended to be examples only. Alterations, modifications and variations can be effected to the particular embodiments by those of skill in the art without departing from the scope, which is defined solely by the claims below.

What is claimed is:

1. A method for process mapping comprising:
remotely recording activities performed by employees on a plurality of computers, wherein the activities comprise screens used and related data that can be obtained through a web-based connection;
automatically analyzing the screens used and related data to generate employee activity data, wherein the activity data comprises events relating to the screens used and states relating to the internal structure of the screens used;
determining processes based on the activity data, wherein the determining processes based on the activity data comprises:
determining generic processes based on predefined recognition patterns, wherein the predefined recognition patterns are provided in a library;
determining specific processes based on generated recognition patterns, wherein the generated recognition patterns are developed from the output of the determining generic processes; and
determining process cases and instances based on case classifiers, wherein the case classifiers comprise a primary identifier and auxiliary data; and
generating a process map based on the determined generic and specific processes and the determined process cases and instances.

2. A method for process mapping according to claim 1, wherein the analyzing the screens used and related data to generate employee activity data comprises:

identifying application in use, screen elements, and screen attributes; and
using artificial intelligence to analyze the screen elements and screen attributes based on the application in use.

3. A method for process mapping according to claim 1, wherein the predefined recognition patterns comprise: generic predefined recognition patterns and customer-specific recognition patterns.

4. A system for process mapping comprising:
a processor; and
a memory storage operatively connected with the processor, wherein the memory stores computer-readable instructions, which, when executed by the processor, performs the functions of the following modules:
an input for remotely recording activities performed by employees on a plurality of computers, wherein the activities comprise screens used and related data that can be obtained through a web-based connection;
a screens module configured to automatically analyze the screens used and related data to generate employee activity data, wherein the activity data comprises events relating to the screens used and states relating to the internal structure of the screens used;
a processes module configured to determine processes based on the activity data, wherein the determine processes based on the activity data comprises:
determining generic processes based on predefined recognition patterns, wherein the predefined recognition patterns are provided in a library;
determining specific processes based on generated recognition patterns, wherein the generated recognition patterns are developed from the output of the determining generic processes; and
determining process cases and instances based on case classifiers, wherein wherein the case classifiers comprise a primary identifier and auxiliary data; and
a process map module configured to generate a process map based on the determined processes.

5. A method for process mapping according to claim 1, wherein the primary identifier is determined using a registry of primary identifier types.

6. A system for process mapping according to claim 4, wherein the screens module:
identifies application in use, screen elements, and screen attributes; and
uses artificial intelligence to analyze the screen elements and screen attributes based on the application in use.

7. A system for process mapping according to claim 4, wherein the predefined recognition patterns comprise: generic predefined recognition patterns and customer-specific recognition patterns.

8. A system for process mapping according to claim 4, wherein the primary identifier is determined using a registry of primary identifier types.

* * * * *